(12) United States Patent  
Jain et al.

(10) Patent No.: US 9,961,701 B2
(45) Date of Patent: May 1, 2018

(54) METHODS AND APPARATUSES FOR TRANSMITTING AN ALLOCATION OF TIME IN A WIRELESS SYSTEM

(75) Inventors: Avinash Jain, San Diego, CA (US); Mohammad Hossein Taghavi Nasrabadi, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1685 days.

(21) Appl. No.: 13/018,618

(22) Filed: Feb. 1, 2011

(65) Prior Publication Data

US 2012/0026987 A1 Feb. 2, 2012

Related U.S. Application Data

(60) Provisional application No. 61/300,752, filed on Feb. 2, 2010.

(51) Int. Cl.
| | |
|---|---|
| *H04J 3/00* | (2006.01) |
| *H04W 74/08* | (2009.01) |
| *H04W 16/28* | (2009.01) |
| *H04W 74/00* | (2009.01) |

(52) U.S. Cl.
CPC ........ *H04W 74/0866* (2013.01); *H04W 16/28* (2013.01); *H04W 74/006* (2013.01)

(58) Field of Classification Search
CPC ............. H04W 74/06; H04W 72/0413; H04W 72/0453; H04W 8/005
See application file for complete search history.

(56) References Cited

U.S. PATENT DOCUMENTS

| 6,438,375 | B1* | 8/2002 | Muller ...................... 455/435.3 |
| 7,406,336 | B2 | 7/2008 | Astely et al. |
| 7,782,822 | B2 | 8/2010 | Xhafa et al. |
| 8,280,445 | B2* | 10/2012 | Yong et al. ................ 455/562.1 |

(Continued)

FOREIGN PATENT DOCUMENTS

| EP | 0841826 A2 | 5/1998 |
| JP | H10155181 A | 6/1998 |

(Continued)

OTHER PUBLICATIONS

International Search Report and Written Opinion—PCT/US2011/023505—ISA/EPO—dated Jun. 7, 2011.

(Continued)

*Primary Examiner* — Melanie Jagannathan
(74) *Attorney, Agent, or Firm* — Patterson & Sheridan, LLP

(57) ABSTRACT

Various methods and apparatuses for transmitting an allocation of time in a wireless communication system are disclosed. In one aspect, an allocation of time for receiving communications via a receive beam direction is transmitted. The allocation of time may be based on information regarding an apparatus known to be located in the receive beam direction. A unique time for receiving communications from each known apparatus may be allocated, or a duration of time for receiving communications from the known apparatuses may vary based on a number of apparatuses known to located in a receive beam direction.

62 Claims, 13 Drawing Sheets

(56) References Cited

U.S. PATENT DOCUMENTS

| | | |
|---|---|---|
| 2002/0068590 A1 | 6/2002 | Suzuki et al. |
| 2005/0014533 A1 | 1/2005 | Cave et al. |
| 2005/0157676 A1 | 7/2005 | Kwak et al. |
| 2006/0164969 A1 | 7/2006 | Malik et al. |
| 2006/0164972 A1 | 7/2006 | van Rensburg et al. |
| 2007/0271568 A1* | 11/2007 | Gorokhov ............... 718/104 |
| 2007/0293218 A1 | 12/2007 | Meylan et al. |
| 2008/0095072 A1* | 4/2008 | Shao et al. ............... 370/254 |
| 2008/0261658 A1 | 10/2008 | Jin et al. |
| 2009/0046653 A1* | 2/2009 | Singh et al. ............. 370/330 |
| 2011/0038355 A1* | 2/2011 | Chou ....................... 370/336 |
| 2011/0075642 A1* | 3/2011 | Cordeiro et al. ......... 370/338 |

FOREIGN PATENT DOCUMENTS

| | | |
|---|---|---|
| JP | 2001509340 A | 7/2001 |
| JP | 2005039728 A | 2/2005 |
| JP | 2008060852 A | 3/2008 |
| WO | 9833233 A1 | 7/1998 |
| WO | 2008087569 A1 | 7/2008 |

OTHER PUBLICATIONS

Taiwan Search Report—TW100104192—TIPO—dated Oct. 24, 2013.
Taiwan Search Report—TW100104192—TIPO—dated Sep. 22, 2014.

\* cited by examiner

404a

| Access Period 0 | Access Period 2 | Access Period 3 |

| Access Period 0 | Access Period 2 | Access Period 3 | General Contention access Period |

| Access Period 0 | Access Period 1 | Access Period 2 | Access Period 3 | Access Period 4 | Access Period 5 |

| Sub-Period 0 | Access Period 1 | Access Period 2 | Sub-Period 3 | Access Period 4 | Access Period 5 | Sub-Period 0 | Sub-Period 3 | Sub-Period 0 |

| STA 6A | STA 6B | STA 6C | STA 6D | STA 6E | STA 6F |

Figure 13

METHODS AND APPARATUSES FOR TRANSMITTING AN ALLOCATION OF TIME IN A WIRELESS SYSTEM

CROSS-REFERENCE TO RELATED APPLICATIONS

This application claims priority under 35 U.S.C. § 119(e) to U.S. Provisional Application No. 61/300,752, filed Feb. 2, 2010, which is hereby incorporated by reference in its entirety.

BACKGROUND

Field

The present disclosure relates generally to communication systems, and more particularly, to transmitting an allocation of time to one or more apparatuses in a wireless network.

Introduction

In order to address the issue of increasing bandwidth requirements that are demanded for wireless communications systems, different schemes are being developed to allow communication over one or more channels while achieving high data throughputs. These schemes may include protocols for transmission or reception of data and control information, forms of signal modulation, or utilization of a physical (PHY) layer or Medium Access Control (MAC) layer.

SUMMARY

The systems, methods, apparatuses, and computer-readable mediums of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide for channel selection.

One aspect includes an apparatus for wireless communication. The apparatus includes a receiver configured to receive communications via a plurality of receive beam directions, and a transmitter configured to communicate an allocation of time for one or more of the receive beam directions. In this aspect, the allocation of time for each of the one or more receive beam directions is based at least in part on information regarding one or more apparatuses known to be located in each respective receive beam direction of the one or more of the receive beam directions.

Another aspect includes a method for wireless communication. The method includes transmitting an allocation of time for one or more of a plurality of receive beam directions. The allocation of time for each of the one or more receive beam directions is based at least in part on information regarding one or more apparatuses known to be located in each respective receive beam direction of the one or more of the receive beam directions. The method further includes receiving a communication from at least one of the one or more apparatuses via the receive beam direction in which the at least one apparatus is known to be located.

Another aspect includes an apparatus for wireless communication. The apparatus includes means for transmitting an allocation of time for one or more of a plurality of receive beam directions, where the allocation of time for each of the one or more receive beam directions is based at least in part on information regarding one or more apparatuses known to be located in each respective receive beam direction of the one or more of the receive beam directions. The apparatus further includes means for receiving a communication from at least one of the one or more apparatuses via the receive beam direction in which the at least one apparatus is known to be located.

Another aspect includes a computer program product for communication comprising a computer readable medium comprising instructions. When executed, the instructions cause an apparatus to transmit an allocation of time for one or more of a plurality of receive beam directions, wherein the allocation of time for each of the one or more receive beam directions is based at least in part on information regarding one or more apparatuses known to be located in each respective receive beam direction of the one or more of the receive beam directions, and cause the apparatus to receive a communication from at least one of the one or more apparatuses via the receive beam direction in which the at least one apparatus is known to be located.

Another aspect includes a wireless node. The node includes an antenna; a receiver configured to receive, via the antenna, communications via a plurality of receive beam directions; and a transmitter configured to communicate an allocation of time for one or more of the receive beam directions. The allocation of time for each of the one or more receive beam directions is based at least in part on information regarding one or more apparatuses known to be located in each respective receive beam direction of the one or more of the receive beam directions.

BRIEF DESCRIPTION OF THE DRAWINGS

These and other sample aspects of the invention will be described in the detailed description that follow, and in the accompanying drawings.

FIG. 9 illustrates an aspect of an access period illustrated in FIG. 4.

FIG. 10 illustrates an aspect of an access period illustrated in FIG. 4.

FIG. 11 illustrates an aspect of an access period illustrated in FIG. 4.

FIG. 12 illustrates an aspect of an access period illustrated in FIG. 4.

FIG. 13 illustrates an aspect of an access period illustrated in FIG. 4.

Figure 1:
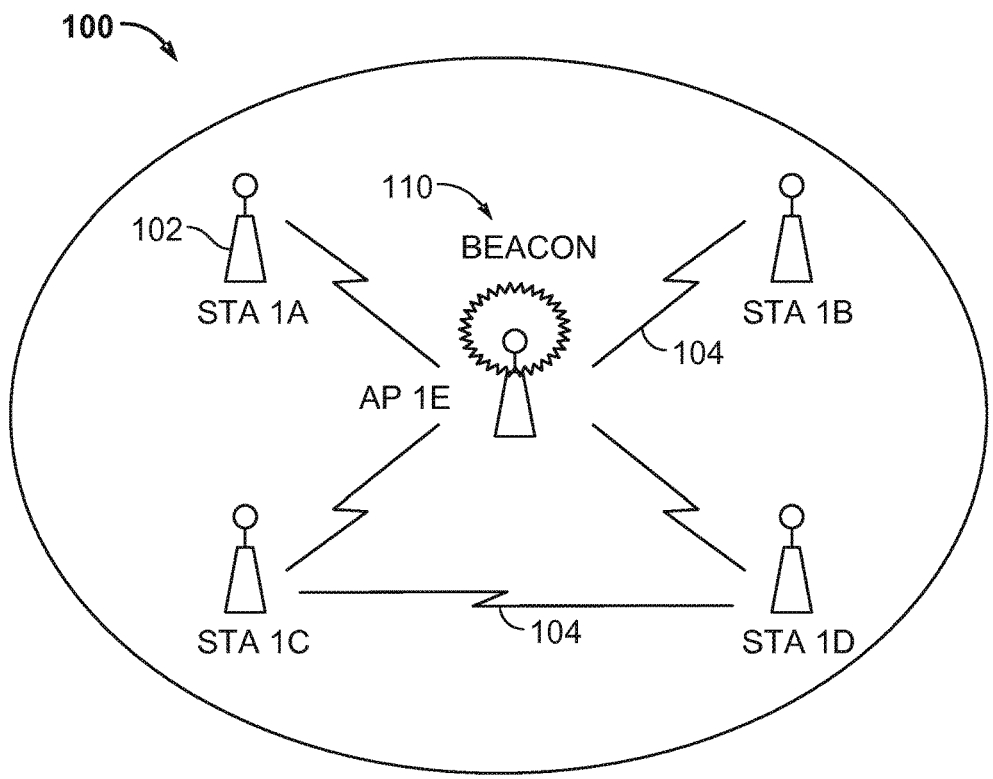
FIG. 1 illustrates a block diagram of a communication system according to an aspect.

The various features illustrated in the drawings may not be drawn to scale. Accordingly, when size or scale of features is not discussed, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process. Like reference numerals may be used to denote like features throughout the specification and figures.

DETAILED DESCRIPTION

Various aspects of methods, systems, and apparatuses are described more fully hereinafter with reference to the accompanying drawings. These methods, systems, and apparatuses may, however, be embodied in many different forms and should not be construed as limited to any specific structure or function presented throughout this disclosure. Rather, these aspects are provided so that this disclosure will be thorough and complete, and will fully convey the scope of these methods, systems, and apparatuses to those skilled in the art. Based on the descriptions herein, one skilled in the art should appreciate that that the scope of the disclosure is intended to cover any aspect of the methods, systems, and apparatuses disclosed herein, whether implemented independently of or combined with any other aspect of the disclosure. For example, a system or apparatus may be implemented or a method may be practiced using any number of the aspects set forth herein. In addition, the scope of the disclosure is intended to cover such an apparatus, system, or method which is practiced using other structure, functionality, or structure and functionality in addition to or other than the various aspects of the disclosure set forth herein. It should be understood that any aspect of the disclosure herein may be embodied by one or more elements of a claim.

One skilled in the art should appreciate that an aspect disclosed herein may be implemented independently of any other aspects and that two or more of these aspects may be combined in various ways. For example, an apparatus may be implemented or a method may be practiced using any number of the aspects set forth herein. Similarly, methods disclosed herein may be performed by one or more computer processors configured to execute instructions retrieved from a computer readable storage medium, for example where the instructions are stored as code on the medium. A computer readable storage medium stores information, such as data or instructions, for some interval of time, such that the information can be read by a computer during that interval of time. Examples of computer readable storage media are memory, such as random access memory (RAM), and storage, such as hard drives, optical discs, flash memory, floppy disks, magnetic tape, paper tape, punch cards, and Zip drives.

In some aspects, a wireless communications system described herein may comprise a wireless area network. For example, the system may comprise a wireless local area network (WLAN) or a wireless personal area network (WPAN). A WLAN may be implemented according to one or more existing or developing standards, for example the Institute of Electrical Engineers (IEEE) 802.11 standard. The IEEE 802.11 standard denotes a set of WLAN air interface standards developed by the IEEE 802.11. For example, systems described herein may be implemented according to any one of the 802.11ad, 802.11ac, 802.11a, 802.11b, 802.11g, and 802.11n standards. Similarly, a WPAN may be implemented according to one or more of the IEEE standards, for example the IEEE 802.15 standard. The IEEE 802.15 standard denotes a set of WPAN air interface standards developed by the IEEE committee. For example, systems described herein may be implemented according to any one of the 802.11ad, 802.15.3b, 802.15.3c, 802.15.4a, 802.15.4b, and 802.15.4c standards. Such area networks may support Multiple Input and/or Multiple Output (MIMO) technology. In addition, the systems described herein may be implemented according to a Bluetooth standard.

Those of skill in the art will recognize that although the system described herein may be implemented according to one or more of the above standards, the system described herein is not limited to such implementations. In addition, those of skill in the art will recognize that while a system may be described as implementing one of these standards, devices present in the system may additionally or alternatively implement another standard. In this situation, it may be beneficial to account for devices that use such other standard in selecting the features of the system. For example, the system may not be configured to receive communications from the other devices, although it may be beneficial for the system to account for such communications from the other devices. In some aspects, the communications from the other devices may interfere with system messages unless select transmit and receive schemes are implemented.

In some aspects, for example in systems implemented according to the 802.11ad or 802.15.3c standards, the PHY layer may be used for millimeter wave (e.g., with carrier frequency of approximately 60 GHz) communications. For example, the system may be configured for millimeter wave communications in the 57 GHz-66 GHz spectrum (e.g., 57 GHz-64 GHz in the United States, and 59 GHz-66 GHz in Japan). Such implementations are particularly beneficial for use with short-range communications (e.g., several meters to tens of meters). For example, the system may be configured to operate within a conference room and to provide wireless communication capabilities between devices located within the conference room. In some aspects, communications are transmitted over a single carrier, for example a carrier having a frequency in the range of 57 GHz-66 GHz. In other aspects, communications are transmitted over multiple carriers or subcarriers, for example according to orthogonal frequency-division multiplexing (OFDM).

Systems utilizing a millimeter wave may have a central entity, such as an access point (AP)/point coordination function (PCF) that manages communications between different devices, also called stations (STAs). Having a central entity may simplify design of communication protocols. In some aspects, there may be a dedicated or predetermined AP. In other systems, a plurality of devices may perform functions of the AP. In some aspects, any device may be used as an AP, or performance of AP functionality may rotate between different devices. Those of skill in the art will recognize that in some aspects, devices that may be described herein as an STA may be used to perform AP functionality. In some aspects, there may be a dedicated or predetermined AP, or a STA may be used to implement AP functionality, or there may be a dedicated or predetermined AP in combination with one or more STAs performing AP functionality.

An AP may comprise, be implemented as, or be referred to as a base station, a base transceiver station, a station, a terminal, a node, an access terminal acting as an access point, a WLAN device, a WPAN device, or some other suitable terminology. An AP may also comprise, be implemented as, or be referred to as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or using some other terminology.

A STA may comprise, be implemented as, or be referred to as an access terminal, a user terminal, a mobile station, a subscriber station, a station, a wireless device, a terminal, a node, or some other suitable terminology. An STA maybe also comprise, be implemented as, or be referred to as a remote station, a remote terminal, a user agent, a user device, user equipment, or using some other terminology.

Although particular aspects are described herein, many variations and permutations of these aspects fall within the scope the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description, and drawings that will hereinafter be described, are merely illustrative of the disclosure rather than limiting.

FIG. 1 illustrates an aspect of a wireless communication system 100. As illustrated, the system 100 may include a number of wireless nodes 102 that can communicate with one another using wireless links 104, for example over a PHY layer using waves having a frequency of approximately 60 GHz, as described above. In the illustrated aspect, the wireless nodes 102 include four stations STA 1A-STA 1D, and an access point AP 1E. Although the system 100 is illustrated with five wireless nodes 102, it should be appreciated that any number of nodes, wired or wireless, may form the wireless communication system 100.

Each of the nodes 102 in the system 100 may include, among other things, a wireless transceiver to support wireless communication and controller functionality to manage communication over the network. The controller functionality may be implemented within one or more digital processing devices. The wireless transceiver may be coupled to one or more antennas to facilitate the transmission of signals and the reception of signals over a wireless channel. Any type of antennas may be used including, for example, dipoles, patches, helical antennas, antenna arrays, and/or others.

The nodes 102 in the system 100 may include any of a wide variety of different device types including, for example, laptops, desktops, palmtops, or tablet computers having wireless networking functionality, computer peripherals having wireless networking capability, personal digital assistants (PDAs) having wireless networking capability, Session Initiation Protocol (SIP) phones, cellular telephones and other handheld wireless communicators, pagers, wireless network interface modules (e.g., wireless network interface cards, etc.) incorporated into larger systems, wireless local loop (WLL) stations, global positioning system (GPS) devices, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/CD players, televisions, MP3 players, audio devices, etc.), and/or others. In one configuration, for example, the system 100 may include a user's laptop computer that is wirelessly communicating with the user's personal digital assistant (PDA) and the user's printer in a short-range network. In another possible configuration, the system 100 may be formed between various audio/visual devices in, for example, a user's living room. In yet another configuration, a user's laptop computer may communicate with terminals associated with other users in a vicinity of the user. Those of skill in the art will recognize that many other scenarios and/or configurations are also possible.

As illustrated, the AP 1E may transmit a beacon signal 110 (or simply a "beacon") to other nodes of the system 100, which may help the other nodes STA 1A-STA 1D to synchronize their timing with the AP 1E, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, for example, some of which are described in additional detail below. Thus, a beacon may include information both common (e.g. shared) amongst several devices, and information specific to a given device.

In the system 100, the STAs 1A-1D may be distributed throughout a geographic region in such a manner that each STA 1A-1D may not be able to communicate with every other STA 1A-1D. Further, each STA 1A-1D may have a different coverage region over which it may communicate. In some aspects, a peer-to-peer network may be established between two or more of the STAs 1A-1D.

In some aspects, an STA is required to associate with the AP in order to send communications to and/or receive communications from the AP. In one aspect, information for associating is included in a beacon broadcast by the AP. To receive such beacon, the STA may perform a broad coverage search over a coverage region, for example. A search may also be performed by the STA by sweeping a coverage region in a lighthouse fashion, for example. After receiving the information for associating, the STA may transmit a reference signal, such as an association probe or request, to the AP. In some aspects, the AP may use backhaul services, for example, to communicate with a larger network, such as the Internet or a public switched telephone network (PSTN).

Figure 2:
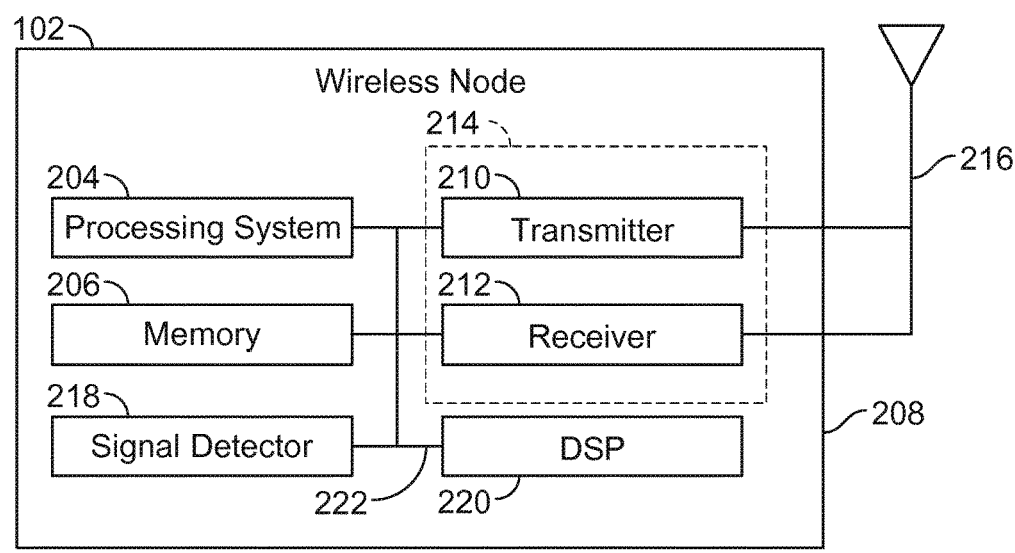
FIG. 2 illustrates an aspect of a node for use in the communication system illustrated in FIG. 1.

FIG. 2 illustrates an aspect of the wireless node 102 that may be employed within the wireless communication system 100. For example, one or more of the STAs 1A-1D or the AP 1E may be implemented as described with respect to FIG. 2. The wireless node 102 is an aspect of a device that may be configured to implement various methods described herein. The wireless node 102 may be enclosed within a housing 208, or the components of the wireless node 102 may be otherwise supported or grouped together by another structure. In some aspects, the housing 208 or other structure is omitted.

The wireless node 102 may include a processing system 204 which controls operation of the wireless node 102. The processing system 204 may in some aspects be referred to as a central processing unit (CPU). In some aspects, the processing system 204 may comprise or be implemented with a circuit configured to perform at least the functions of the processing system 204. Memory 206, which may include both read-only memory (ROM) and random access memory (RAM) and may be volatile or permanent, may provide instructions and data to the processing system 204. A portion of the memory 206 may also include non-volatile random access memory (NVRAM). The processing system 204 typically performs logical and arithmetic operations based on program instructions stored within the memory 206, but may of course perform other operations. The processing system 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The instructions in the memory 206 may be executable to implement the methods described herein. Additionally, the node 102 may be configured to accept another type of computer readable medium, such as a disk or form of memory card, or may be connected to a computer readable medium, such as a hard drive, which may comprise instructions that when executed cause the node 102 to execute a method or process described herein.

The wireless node 102 may also include a transmitter 210 and a receiver 212 to allow transmission and reception of communications between the wireless node 102 and a remote location. Those of skill in the art will recognize that the transmitter 210 and receiver 212 may be combined into a transceiver 214. An antenna 216 may be attached to the housing 208 and electrically coupled to the transceiver 214. The wireless node 102 may also include (not shown) multiple transmitters, multiple receivers, multiple transceivers, and/or multiple antennas.

Multiple antennas at the wireless node 102 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal. In addition, multiple antennas may enable increased ability to implement beamforming or a plurality of communication beam patterns. In some aspects, one or more antennas are steerable.

The wireless node 102 may also include a signal detector 218 that may be used in an effort to detect and quantify the level of signals received by the transceiver 214. The signal detector 218 may detect such signals as total energy, energy per subcarrier per symbol, power spectral density, and other signals. The wireless node 102 may also include a digital signal processor (DSP) 220 for use in processing signals. Of course, the DSP 220 may be omitted in some aspects, or the functions of the DSP may be performed by the processing system 204.

The various components of the wireless node 102 may be coupled together by a bus system 222, which may include a power bus, a control signal bus, and a status signal bus in addition to a data bus. Of course, the components may be coupled or electrically connected in other ways or using other means as well.

As described above, either an STA, an AP, or both may be implemented according the description of the wireless node 102 above. In some aspects, any device capable of transmitting a beacon signal may serve as an AP. In some aspects, however, in order for an AP to be effective it may have to have a good link quality to all STAs in a network. At high frequencies, where signal attenuation may be relatively severe, communications may be directional in nature and may use beamforming (e.g. beam training) to increase gains. As such, an effective AP may beneficially have a large sector bound (e.g. a wide steering capability). The AP may have a large beamforming gain (which may be provided, for example, by multiple antennas), may be mounted so that a line of sight path exists to most areas served by the wireless system 100, and/or may use a steady power supply for periodic beacon transmissions and other management functions. Even if a device has an antenna steering capability that may be limited to a small sector bound, an available power that may be limited, and/or a location that may be variable, however, the device may in some aspects perform as an AP, for example when forming peer-to-peer networks. Peer-to-peer networks may be used for a variety of purposes, such as side-loading, file sharing, and other purposes. In some aspects, a peer-to-peer network may be created where no device may efficiently transmit to and receive from all other devices.

In some aspects, the wireless node 102 is equipped with multi-mode radios with different frequency transceivers, for example a 60 GHz transceiver, a 2.4 GHz transceiver, a 5 GHz transceiver, etc. In some implementations, lower frequency communications may be performed omni-directionally and higher frequency communications may be performed directionally. Such aspects may be advantageous in a network in which an omni-directional protocol may be used to locate and set up communications, for example where the communications use a directional protocol.

FIGS. 3A-3D illustrate aspects of beamforming. As described above, the wireless node 102 may be configured to implement one or more types of beamforming, for example using the antenna 216 or a plurality of antennas. Although the beamforming will be described below with respect to an AP, those of skill in the art will appreciate that an STA as described above may implement such beamforming. Those of skill in the art will additionally appreciate that the beamforming described below may refer to signals being transmitted, as well as to a beam or direction in which signals are received. Further, those of skill in the art will appreciate that an AP may implement different beamforming for receiving as for transmitting, and/or may dynamically adjust any such beamforming. The beamforming may also be predetermined.

Figure 3A:
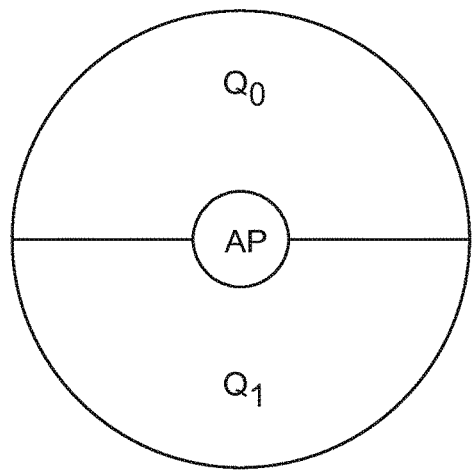
FIGS. 3A-3D illustrate aspects of beamforming for use in the communication system illustrated in FIG. 1.

The term quasi-omni pattern generally relates to the lowest resolution pattern that covers a very broad area of a region of space of interest around a device. An AP, for example as illustrated by AP 1E in FIG. 1 or as implemented as illustrated in FIG. 2, may cover the region of space of interest in a minimal set of, possibly overlapping, quasi-omni patterns. A set size equal to one may indicate that the AP is able to cover the spatial region of interest with only one quasi-omni pattern, indicating that the AP is omni-capable. The quasi-omni transmit and receive patterns may be identified by $Q_n$, where n represents a respective direction. Those of skill in the art will appreciate that the beams may be overlapping, and that each direction denoted by a separate n need not be distinct. A beam pattern having two approximately equal patterns is illustrated in FIG. 3A. In this aspect, n=2.

Of course, beams having a narrower azimuth than described with respect to the quasi-omni pattern may be used. Such narrower beams may be advantageous because each beam may be characterized by a greater gain and increased signal to noise ratio (SNR) as compared to the beams used in the quasi-omni pattern. This is particularly advantageous in systems which experience high signal fading or decay.

Figure 3B:
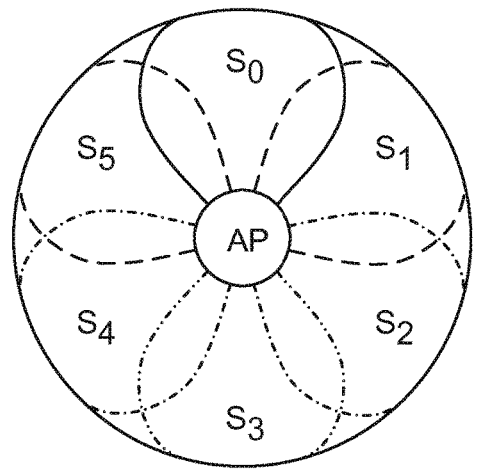

FIG. 3B illustrates an aspect of beamforming where the azimuth is narrower than described with respect to the quasi-omni pattern. The transmit and receive patterns are identified by $S_0$-$S_5$. As can be seen in FIG. 3B, the beams formed by the AP may overlap. Of course, the beam pattern may comprise beams which do not overlap. As described above, the AP may be configured to change a direction in which the beam is pointing. Thus, the AP in FIG. 3B may first send and/or receive communications via beam $S_1$, then via beam $S_2$, etc. In some aspects, the AP need not change directions so as to point the beam in successive directions to form a complete circle (i.e. pointing in directions 0-5 in order, then starting again at 0). The AP may instead change directions in any order, or may randomly select a direction in which to point.

Figure 3C:
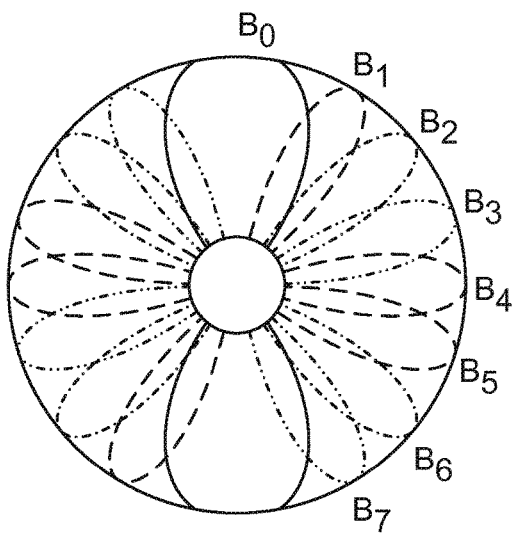
Figure 3D:
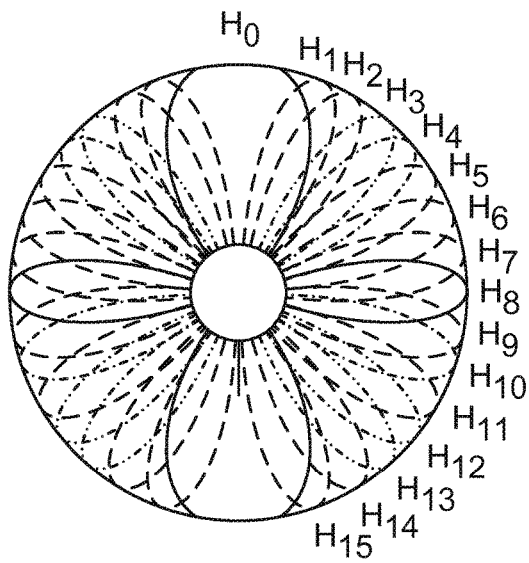

FIGS. 3C and 3D illustrate aspects having even narrower beams. FIG. 3C shows a beam pattern having 16 directions $B_0$-$B_{15}$ (only half of these directions, $B_0$-$B_7$, are numbered in the illustration), and FIG. 3D shows a beam pattern having 32 directions $H_0$-$H_{31}$ (only half of these directions, $H_0$-$H_{15}$, are numbered in the illustration). Narrower beams may provide the advantages discussed above, but may also require additional overhead information, or may require additional time for changing the direction of the beam. Thus, when selecting a number of beams to use, the requisite overhead may need to be considered. Although the beams are illustrated as being substantially symmetric, the beam shapes, sizes, and/or distribution may vary.

The term sector may generally be used to refer to a second level resolution pattern that covers a relatively broad area of multiple beams. A sector can cover a set of consecutive and nonconsecutive beams and different sectors can overlap. Beams can be further divided into high-resolution (HRS) beams as a high level of resolution pattern.

The multi-resolution definition of quasi-omni patterns, sectors, beams and HRS beams may become a multi-level definition, where each level may use a set of antenna patterns. Therefore, quasi-omni patterns may represent a first set of antenna patterns, sectors may represent a second set of antenna patterns, beams may represent a third set of antenna patterns preferably derived from the second set of antenna patterns, and HRS beams may represent a fourth level of antenna patterns preferably derived from the third set of antenna patterns.

Figure 4:
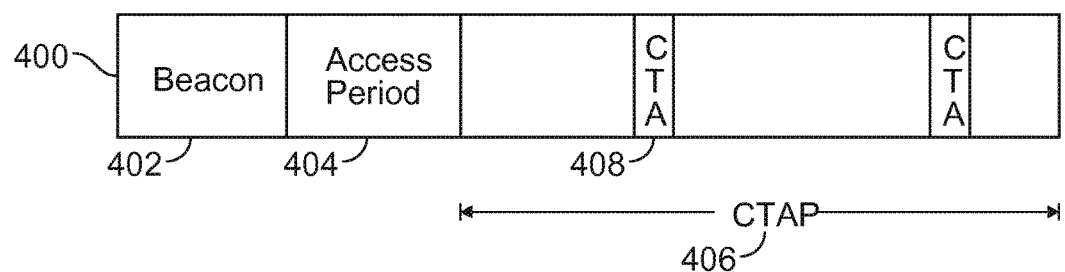
FIG. 4 illustrates an aspect of a superframe structure.

FIG. 4 illustrates an aspect of a superframe structure, as previously described above. The superframe 400 may comprise a beacon interval 402, an access period 404, and a channel time allocation period (CTAP) 406. The CTAP 406 may comprise multiple channel time allocations (CTAs) 408.

In some aspects, an AP, for example the AP 1E or an AP implemented as described with respect to FIG. 2, broadcasts a beacon during the beacon interval 402. To ensure that wireless devices within a communication area of the AP, for example the STAs 1A-1D, receive the beacon, the AP may broadcast the beacon using any of a multitude of methods. For example, when the AP is configured to broadcast in a substantially omni-directional pattern or in a quasi-omni pattern, for example as illustrated in FIG. 3A, the AP may only broadcast a single beacon or may broadcast two beacons, for example in each of the directions 1 and 2 using beam patterns $Q_0$ and $Q_1$ illustrated in FIG. 3A. When the AP broadcasts the beacon using a narrower beam, for example as illustrated in FIGS. 3B-3D, the AP may alternately broadcast the beacon in a plurality of directions during the beacon interval 402. Thus, those of skill in the art will appreciate that the AP may transmit a beacon once during the beacon interval, or the AP may transmit a beacon several times during the beacon interval. For example, the beacon interval 402 may be divided into six periods when the AP utilizes the beam pattern illustrated in FIG. 3B, and the AP may transmit a beacon in each of directions 0-5 during a respective period.

The access period 404 may comprise a period of time which the AP has allocated to receive, for example via the receiver 212 and the antenna 216, communications from one or more wireless devices, for example the STAs 1A-1D. Communications received during this time may comprise any number of different types of communications. For example, the communications may comprise control information transmitted from one of the STAs 1A-1D. The control information may comprise information identifying the transmitting STA, a modulation scheme supported by the transmitting STA, an amount of data that the transmitting STA has stored and desires to transmit, or an availability of the transmitting STA, among other information. The communications may also comprise request messages transmit from an STA. The request messages may comprise information indicating that the transmitting STA has data to transmit and requesting a time at which to transmit the data. Further, the communications may comprise an association probe requesting that a transmitting STA be associated with the AP.

The CTAP 406 may comprise a period which the AP has allocated to receive, for example via the receiver 212 and the antenna 216, data from one or more wireless devices, for example in response to control information or request messages received during the access period 404 or a previous access period. The AP may designate, for example using the processing system 204, a plurality of wireless devices, for example a plurality of the STAs 1A-1D, from which to receive data during the CTAP 406. In addition, the AP may designate a period during the CTAP during which the AP will receive data from a particular STA. This period may be represented by the CTA 408. Thus, an STA may be scheduled to transmit data during a given CTA by sending a request message in response to a beacon.

Figure 5:
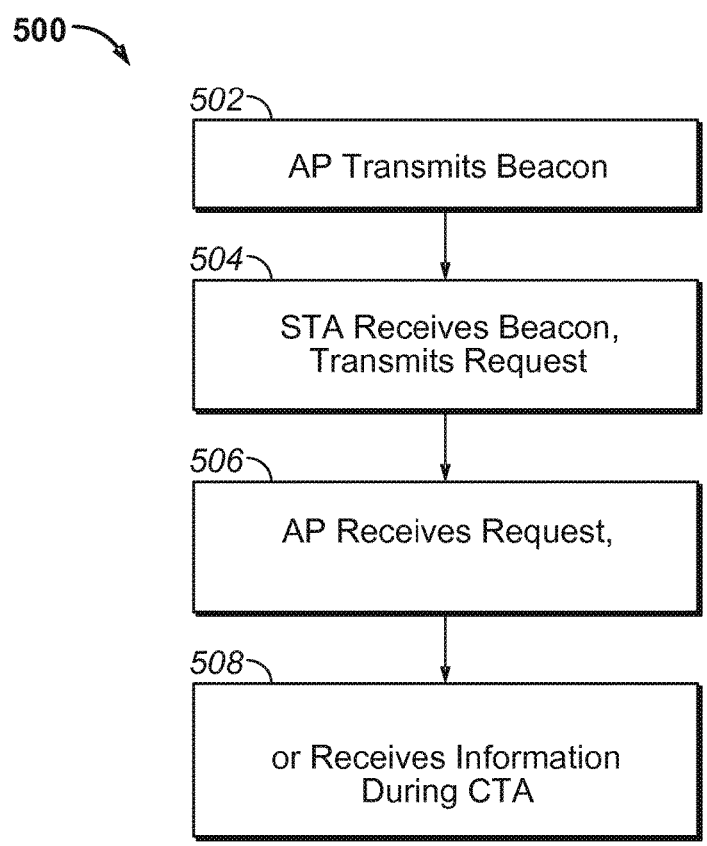
FIG. 5 illustrates an aspect of a method for communicating in the communication system illustrated in FIG. 1.

FIG. 5 illustrates an aspect of a method 500 for communicating in a wireless system, for example in the system 100 illustrated in FIG. 1. The method 500 may be utilized to communicate according to the superframe 400 described with respect to FIG. 4, for example, as will be described below. Those of skill in the art will recognize that the method 500 may be used for other communications as well.

At step 502, the AP transmits a beacon during the beacon interval 402. As discussed above, the AP may transmit the beacon utilizing, for example, the transmitter 210 and the antenna 216. In some aspects, the beacon comprises information regarding the access period 404 in which communications will be received by the AP. At step 504, an STA receives the beacon, for example using the receiver 212 and the antenna 216. In response, the STA sends control information, a request message, an access probe, or other communication to the AP. In the aspect illustrated in FIG. 5, the STA sends a request to the AP, for example a request message as described above. In an aspect where the beacon comprises information regarding the access period 404, the STA transmits the request during the access period 404. At step, 506, the AP receives the request, and in response allocates and transmits an indication of the CTA 408 to the STA for transmitting or receiving information. At step 508, the STA receives the indication of the CTA 408, and transmits or receives the information during the CTA 408, for example to or from the AP.

As described above, the AP may transmit and receive information via a plurality of beam directions. Thus, during the access period 404, the AP may be configured to shift a direction of a receive beam. Forming the beam and/or steering a beam may be referred to as beamforming. A multitude of antenna configurations such as a single antenna element, sectored antennas, switched antennas, and 1-dimensional (1-D) and 2-dimensional (2-D) antenna arrays may support beamforming. Those of skill in the art will understand how to implement appropriate beamforming in the AP, for example utilizing the components described in FIG. 2. In one aspect, the processing system 204 may control the antenna 216 to implement beamforming.

In order to receive communications during the access period 404 from STAs in the communication area of the AP, the AP may be configured to receive communications from one or more receive beam directions during the access period 404. In such aspect, the access period 404 may comprise one or more divisions during which communications will be received via a respective receive beam direction. For example, the access period 404 may comprise six divisions when the AP utilizes the beam pattern illustrated in FIG. 3B, and the AP may receive communications via each of receive beam directions 0-5 during a respective division.

Figure 17:
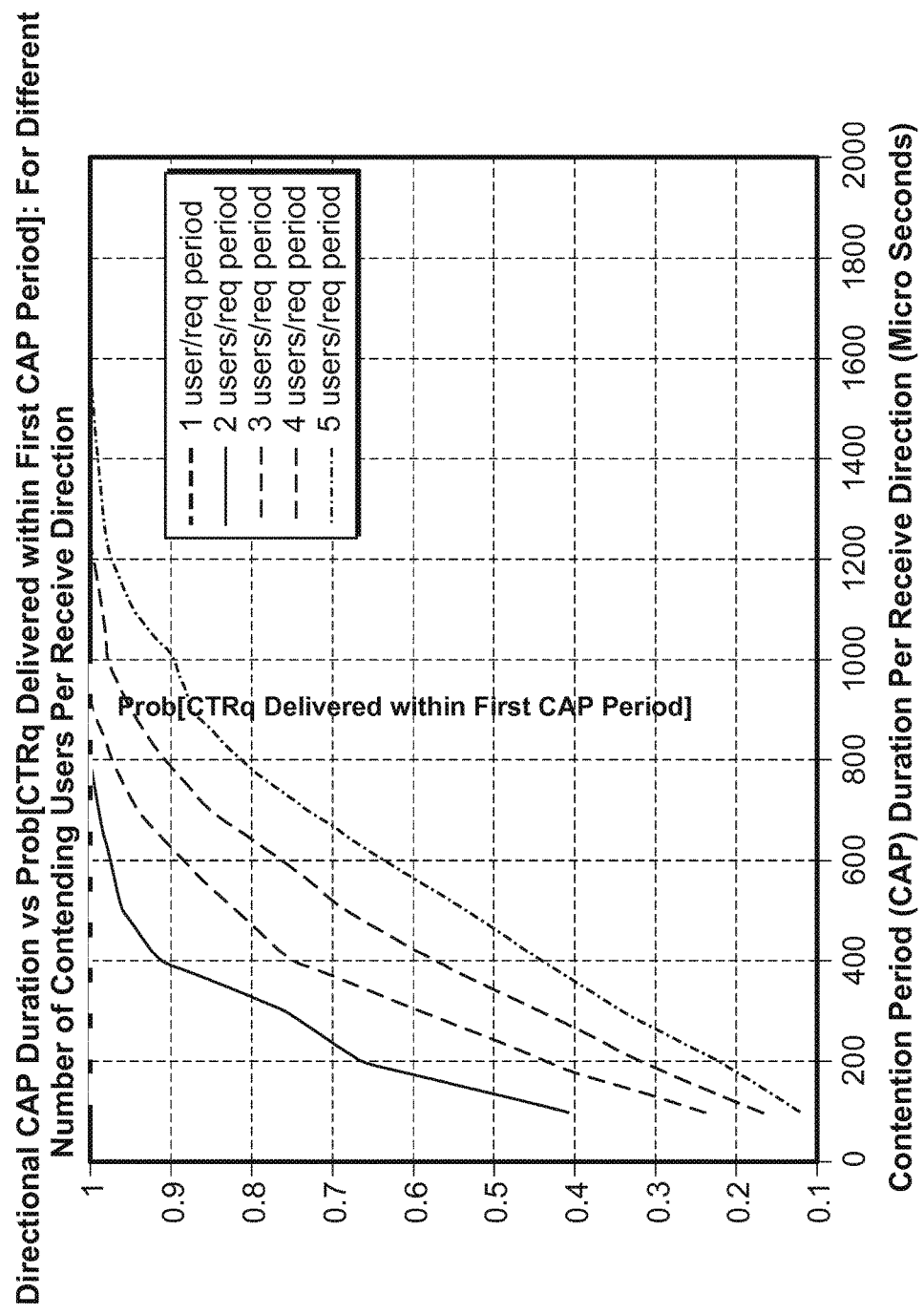
FIG. 17 illustrates a graph showing the probability that a communication will be received for different probabilities of a request message.
Figure 18:
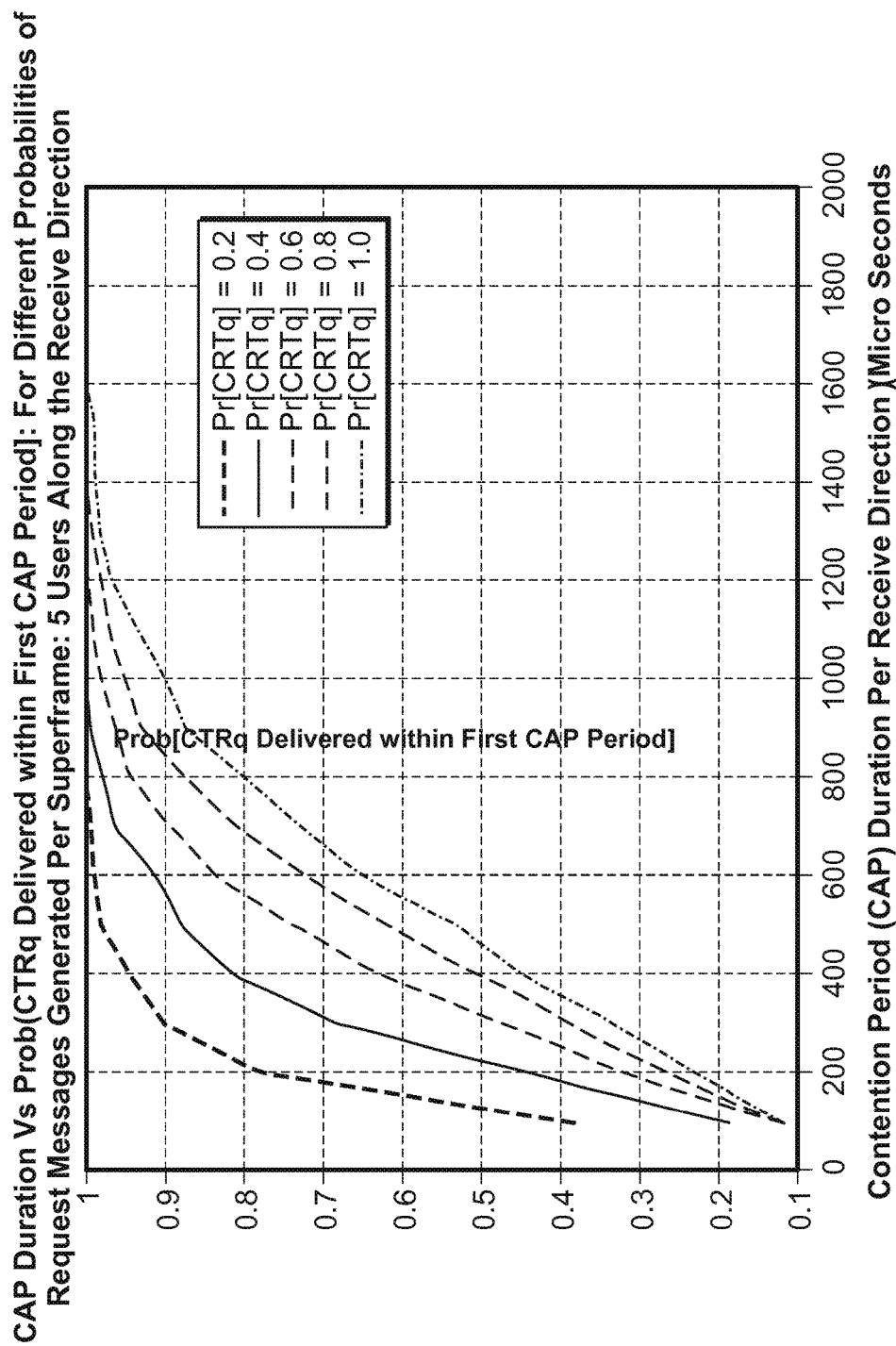
FIG. 18 illustrates a graph showing the probability that a communication will be received for different quantities of transmitting apparatuses.

In some aspects, each division of the access period is approximately equal. During such divisions, a multitude of STAs may attempt to transmit communications to the AP. When a plurality of communications are transmitted at a similar time, however, the communications may conflict and the AP may not be able to properly receive one or more of the communications. This problem is exacerbated when a number of STAs are located in a similar receive beam direction. This configuration increases the likelihood that communications sent by the STAs will conflict during the access period for that receive beam direction. For example, FIG. 17 illustrates a probability that a channel time request (CTRq) will be received within a contention access period (CAP) for differing quantities of transmitting STAs. FIG. 18 illustrates a probability that a channel time request will be received, where the probability of a CTRq differs as illustrated, and where it is assumed that there are five STAs located in the receive beam direction. These figures illustrate data for a system implemented in a conference room.

Figure 6:
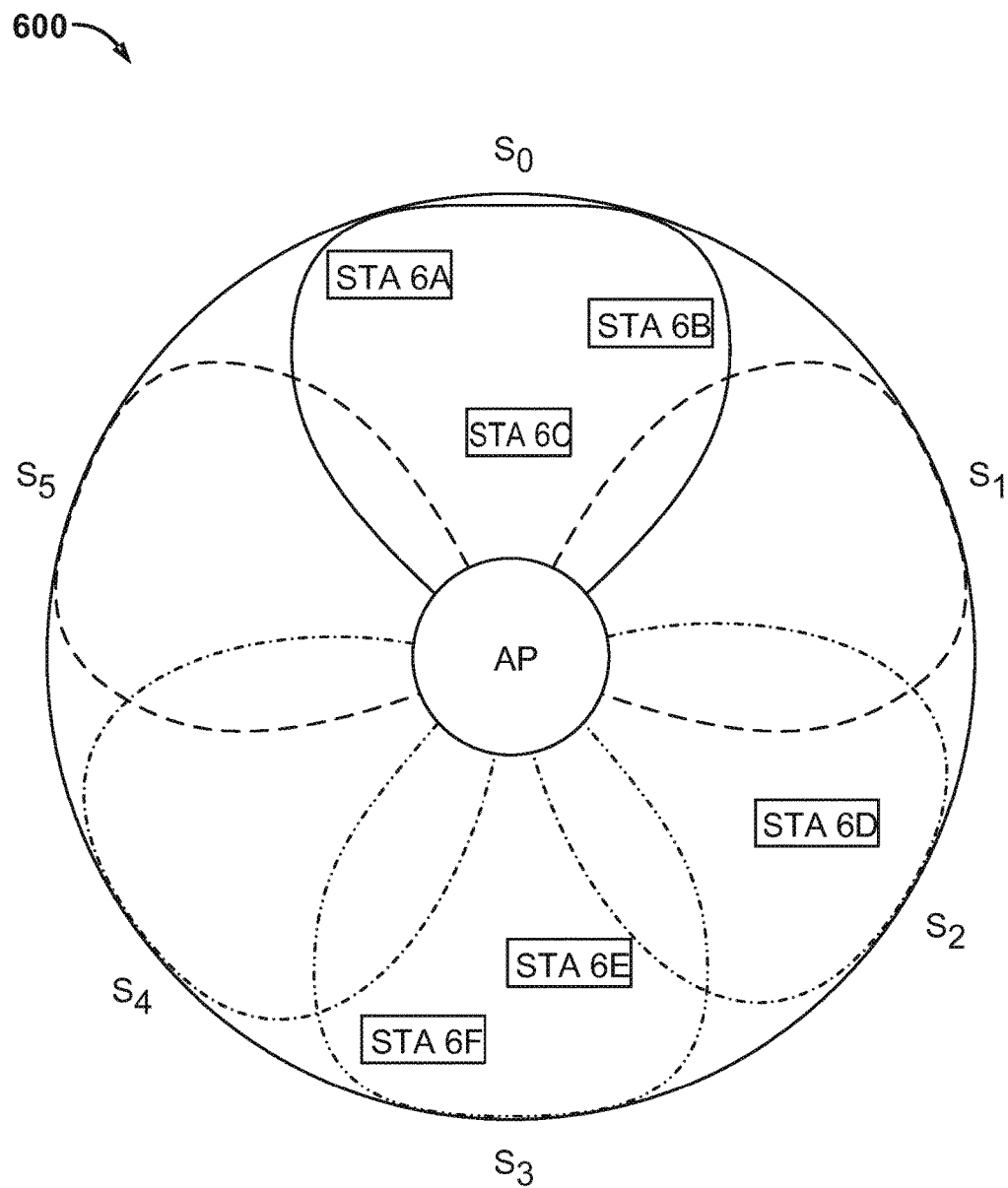
FIG. 6 illustrates an aspect of a system having nodes located in a plurality of receive beam directions.

FIG. 6 illustrates an aspect of a system 600 having STAs 6A-6F located in plurality of receive beam directions 0-5. In the system 600, the receive beam patterns $S_0$-$S_5$ utilized by the AP are similar to those described with respect to the receive beam patterns $S_0$-$S_5$ of FIG. 3B. One or more of the STAs 6A-6F may be implemented as described with respect to FIG. 2, as may the AP illustrated in FIG. 6.

As can be seen in FIG. 6, the STAs 6A-6C are located in receive beam direction 0, the STA 6D is located in receive beam direction 2, and the STAs 6E and 6F are located in receive beam direction 3. There are no STAs illustrated as being located in receive beam directions 1, 4, and 5. Those of skill in the art will recognize that a greater or fewer number of STAs may be located within the system 600, and that the STAs may be distributed among the receive beam directions in any multitude of configurations. In addition, other receive beam patterns may be utilized besides those illustrated in FIG. 6.

As described above, the access period 404 may be divided into six divisions, for example, and the AP may receive communications from each of the receive beam directions 0-5 in a respective one of the divisions. Thus, the AP may receive communications from any of the STAs 6A-6C in a division, from the STA 6D in another division, and from the STAs 6E and 6F in yet another division. When receiving communications during the division corresponding to receive beam direction 0, however, communications transmitted from the STAs 6A-6C may conflict, inhibiting proper reception by the AP. In some aspects, STAs may be configured to transmit a communication again if some form of acknowledgement isn't received from the AP. In some aspects, the STAs may only attempt such retransmission when there is sufficient time remaining in the respective division of the access period 404.

In one aspect, the AP is configured to allocate time during the access period 404 to receive communications from one or more of the receive beam directions based at least in part on information regarding apparatuses known to be located in the receive beam directions. The time may be allocated so as to decrease the likelihood of the AP being unable to properly receive communications due to conflicts.

Figure 7:
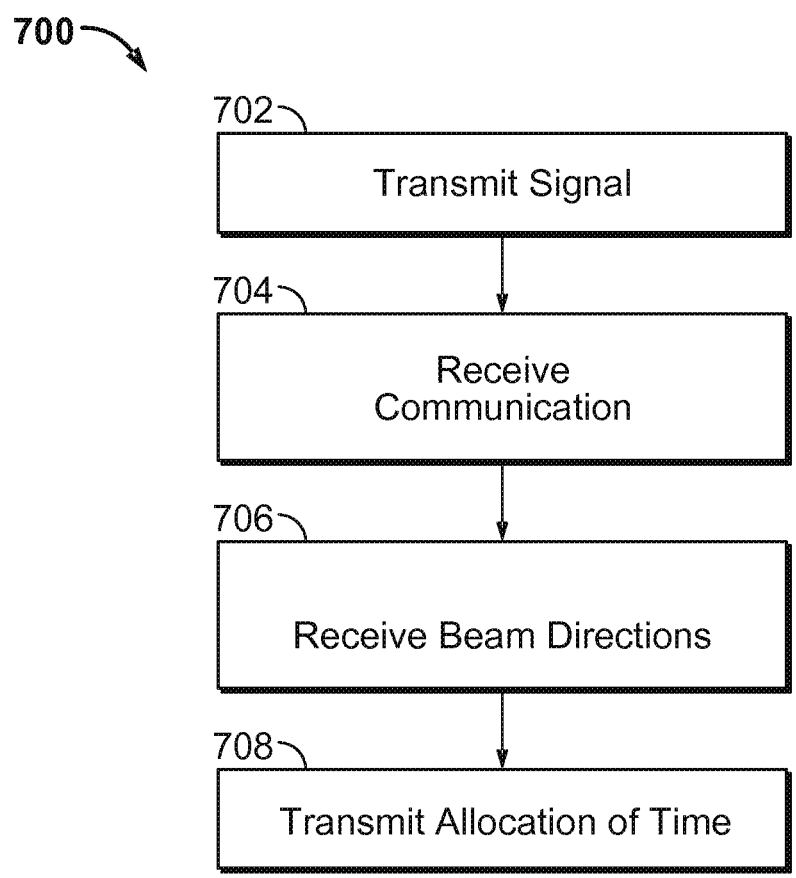
FIG. 7 illustrates an aspect of a method of allocating time in a communication system.

FIG. 7 illustrates an aspect of a method 700 of allocating time in a communication system, for example the system 600. The method 700 may be performed by any device that receives communications, for example by the AP illustrated in the system 600. Although the method 700 and other methods may be described with respect to an AP, those of skill in the art will appreciate that the method 700 and other methods described herein may be used by any node or device that receives communications.

At block 702, the AP transmits a signal. For example, the AP may broadcast a signal indicating the access period 404. In response to the transmitted signal, the AP receives communication at block 704 from one or more apparatuses. For example, the AP may receive an association probe or a request message. At block 706, the AP updates a data structure including receive beam directions. The data structure may include information regarding whether any apparatuses are located in each of the receive beam directions, a quantity of apparatuses in the receive beam directions, or device IDs of apparatuses located in each of the receive beam directions, for example.

The receive beam directions are known to the AP, or may be dynamically determined by the processing system 204 of the AP. Information regarding apparatuses known to be in the receive beam directions may be determined based on the receiving at block 704. For example, the AP may record information as disclosed above in the data structure based on communications that are received via the receive beam directions. In one aspect, the AP may perform a method of beam tracking to identify apparatuses located in the receive beam directions. These apparatuses will then be known to the AP as being located in each of the receive beam directions. Those of skill in the art will recognize methods of beam tracking.

The data structure may comprise any stored information regarding receive beam directions. In one aspect, the data structure is stored in a database. In another aspect, the data structure is stored as a list or table. For example, the data structure may be stored as a list of receive beam directions known to have apparatuses located therein. If the list is implemented by the AP in the system 600, an aspect of the list may take the following form.

| Receive Beam Directions |
| --- |
| 0 |
| 2 |
| 3 |

The data structure embodied above identifies that apparatuses are located in each of receive beam directions 0, 2, and 3. As discussed above, the STAs 6A-6F are located in these receive beam directions in the system 600.

As another example, the data structure may be stored as a table correlating receive beam directions to a quantity of apparatuses in the receive beam directions. If the list is implemented by the AP in the system 600, an aspect of the table may take the following form.

| Receive Beam Directions | Number of Apparatuses |
| --- | --- |
| 0 | 3 |
| 1 | 0 |
| 2 | 1 |
| 3 | 2 |
| 4 | 0 |
| 5 | 0 |

The data structure embodied above identifies that three apparatuses are located in receive beam direction 0, one apparatus is located in the receive beam direction 2, and two apparatuses are located in the receive beam direction 3. As discussed above, the STAs 6A-6C are located in receive beam direction 0, the STA 6D is located in the receive beam direction 2, and the STAs 6E and 6F are located in the receive beam direction 3 in the system 600. Although the table above stores information regarding receive beam directions having no apparatuses located therein, the table may omit this data.

As yet another example, the data structure may be stored as a table correlating device IDs of apparatuses to the receive beam directions. If the list is implemented by the AP in the system 600, an aspect of the table may take the following form.

| Device ID | Receive Beam Direction |
| --- | --- |
| STA 6A | 0 |
| STA 6B | 0 |
| STA 6C | 0 |
| STA 6D | 2 |
| STA 6E | 3 |
| STA 6F | 3 |

The data structure embodied above identifies that each of the STAs 6A-6C are located in receive beam direction 0, the STA 6D is located in the receive beam direction 2, and each of the STAs 6E and 6F are located in the receive beam direction 3 in the system 600. The device ID may comprise any number of identifiers that may be used to identify an apparatus. For example, the device ID may comprise a serial number, a telephone number, a mobile identification number (MIN), an electronic serial number (ESN), an international mobile equipment identifier (IMEI), an international mobile subscriber identifier (IMSI), or any other identifier that may be used to identify an apparatus. Those of skill in the art will recognize other data structures that may be implemented according to the teachings herein.

In some aspects, an apparatus may not be physically located within the receive beam direction in which the apparatus is known to be located by the AP. In these aspects, the AP may receive communications from the apparatus via the receive beam direction in which the apparatus is known to be located while the apparatus itself is actually physically located in another receive beam direction, for example due to a signal reflection or multipath. For example, the STA 6C in the system 600 may actually be located in direction 5, but the AP may receive communications from the STA 6C via the receive beam direction 0 because an obstacle between the STA 6C and the AP causes the communications to bounce and be received from the receive beam direction 0. Thus, in some aspects, the direction in which an apparatus is known to be located may refer to a direction from which communications from that apparatus are received.

Returning to FIG. 7, the AP may transmit an allocation of time to one or more of the apparatuses known to be located in at least one of the receive beam directions. The time allocations may be determined by the processing system 204 of the AP, and may be determined utilizing any number of methods. In some aspects, the time allocations may be transmitted in the beacon, and may refer to a division of the access period 404 during which the AP will receive communications from one or more of the apparatuses. The method 700 may be repeated any number of times. The data structure may be continually updated based on each communication the AP receives, or the AP may update the data structure at select times, for example at the end of every access period, or after every fifth superframe. Those of skill in the art will recognize other methods and schedules of forming and updating the data structure, and transmitting the allocation of time.

Figure 8:
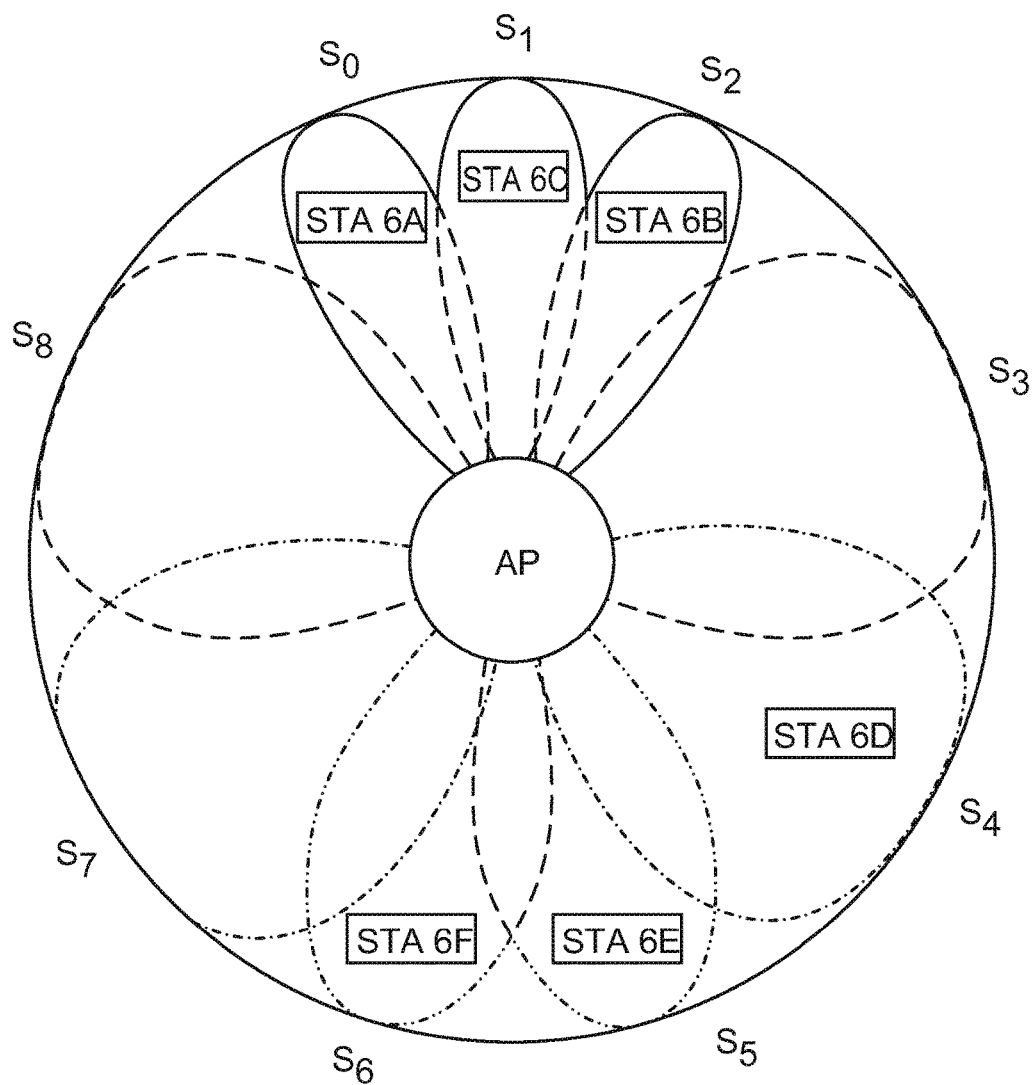
FIG. 8 illustrates an aspect of beamforming for use in the system illustrated in FIG. 6.

FIG. 8 illustrates an aspect of beamforming according to information determined from the method 700, for example for use in the system 600. In this aspect, the processing system 204 determines a beam pattern such that a single receive beam is targeted at each known apparatus. As can be seen in FIG. 8, the AP receives communications via receive beam directions 0-8. In the aspect illustrated in FIG. 8, receive beam directions 0 and 3 have been split such that communications from each of the STAs 6A-6C, 6E, and 6F are received via a separate receive beam direction. Communications from the STA 6A are received via receive beam direction 0; communications from the STA 6B are received via receive beam direction 1; communications from the STA 6D are received via receive beam direction 2; communications from the STA 6E are received via receive beam direction 5; communications from the STA 6F are received via receive beam direction 6.

Forming beams in this way may increase the SNR of communications received from each of the STAs, for example due to narrowed beams. This is advantageous, especially in systems which are prone to signal degradation, for example which may occur in systems implementing millimeter waves. In addition, directing a beam specifically to a single apparatus may reduce conflicts because communications from other apparatuses may not be perceived by the AP. The data structure discussed above may store more particular information regarding the location of the apparatuses, and may be updated to reflect the new beams.

Figure 14:
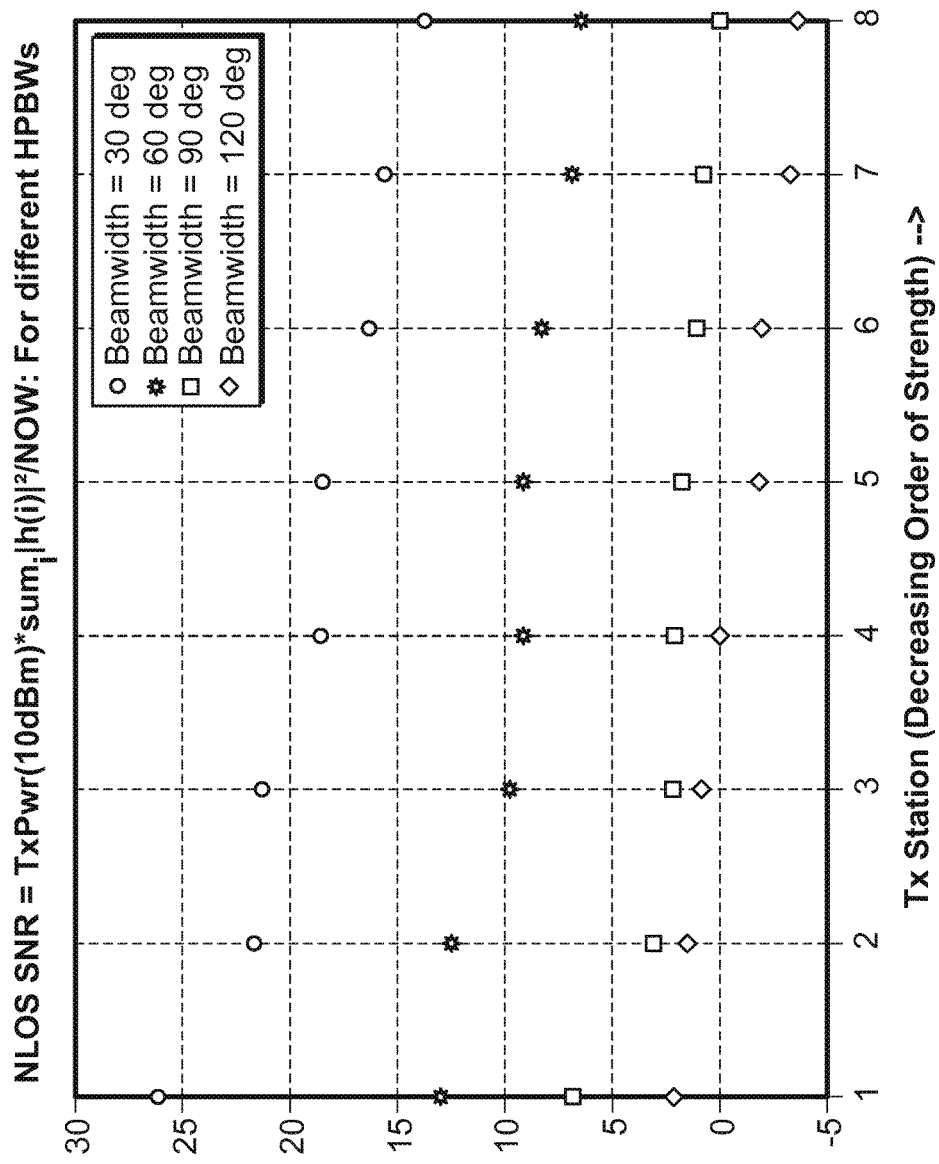
FIG. 14 illustrates a graph of observed signal to noise ratios for different half power beam widths.
Figure 15:
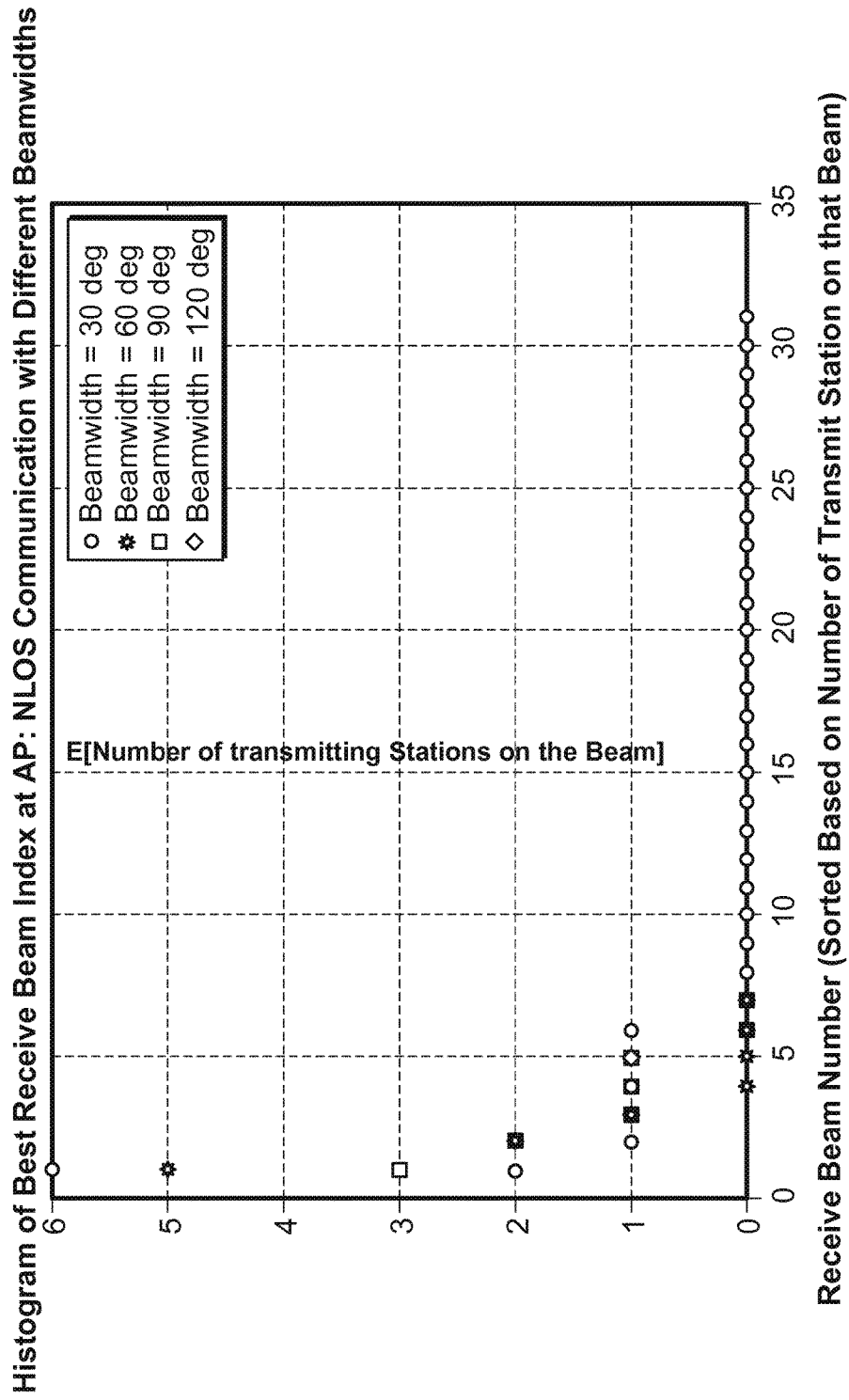
FIG. 15 illustrates a histogram of a receive beam index for different beamwidths.
Figure 16:
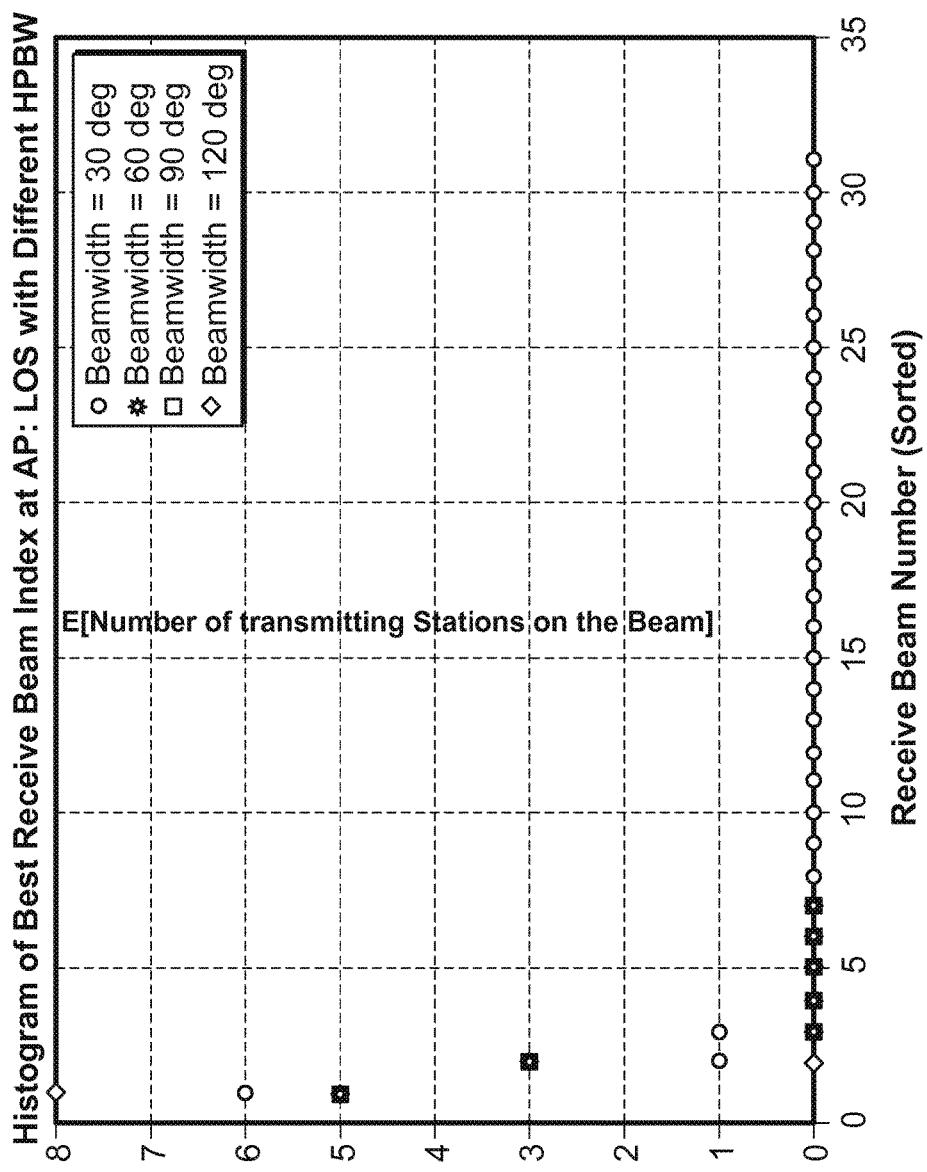
FIG. 16 illustrates a histogram of a receive beam index for different beamwidths.

Thus, the beamwidth may affect the reliability and/or quality or communications. For example, a comparison of relative SNR to beam width is shown in FIG. 14, which illustrates a plot of an SNR observed at an AP for different half power beamwidths (HPBW), where there is no line of sight (NLOS) between the STAs and the AP. FIG. 15 illustrates a histogram of a best receive beam index as received at an AP for different beamwidths, where there is no line of sight between the STAs and the AP. FIG. 16 illustrates a histogram of a best receive beam index as received at an AP for different half power beamwidths, where there is a line of sight between the STAs and the AP.

The directions in which the receive beam will be pointed may be transmitted in the beacon. In addition, the duration that the AP will receive communications via the receive beam directions may be included in the beacon. In other aspects, the STAs may determine at what times the AP will receive communications from the receive beam directions based on the transmitted receive beam directions, for example according to a common algorithm. Thus, the allocation of time transmitted by the AP may be indicated by a receive beam direction, which may indicate to an apparatus that the AP will receive communications via the apparatus's receive beam direction for a period of time.

As discussed above, the AP may instead receive communications from a plurality of apparatuses via a single receive beam direction, for example as illustrated in FIG. 6. In some aspects, the AP may only shift the receive beam direction such that communications will be received via receive beam directions known to have at least one apparatus located therein. Similar to the aspect described above with respect to FIG. 8, the receive beam directions from which communications will be received may be transmitted in the beacon. In this aspect, the access period 404 may be divided such that the AP will receive communications only from the receive beam directions known to have apparatuses located therein.

FIG. 9 illustrates an aspect 404a of the access period 404 illustrated in FIG. 4. The access period 404a has divisions for receiving communications only via the receive beam directions known to have apparatuses located therein. FIG. 9 shows the access period 404a configured for receiving communications in the system 600. Thus, the access period 404a illustrated in FIG. 9 has divisions for receiving communications via receive beam directions 0, 2, and 3. These divisions are referred to as Access Period 0, Access Period 2, and Access Period 3, respectively, in FIG. 9.

During the Access Period 0 and the Access Period 2, the AP may receive communications from a plurality of the STAs. Due to the fact that the STAs may need to contend during these periods to have their communications received by the AP, these periods may be referred to as contention access periods (CAPs). The Access Periods 0, 2, and 3 are shown as being roughly the same size, but need not be identical in length or duration.

FIG. 10 illustrates another aspect 404b of the access period 404. The access period 404b has divisions for receiving communications via the receive beam directions known to have apparatuses located therein. In addition, the access period 404b has a contention access period that is not reserved for receiving communications from any certain direction, which is referred to as a General Contention Access Period in FIG. 10. During this time, the AP may receive communications from apparatuses in any number of directions, for example from an STA transmitting an association probe such that it may be included in the data structure of the AP. The AP may receive communications from each of the receive beam directions 0-5 in the system 600 during this time, or only from a subset of the directions 0-5. General Contention Access Periods may also be interleaved between each Access Period corresponding to a specific receive beam direction. The duration of each of the Access Periods may be varied.

In some aspects, the length or duration of each of the Access Periods is based on a number or quantity of apparatuses known to be located in the respective receive beam direction associated with the Access Period. As described above, in some aspects, whether there are any apparatuses known to be located in a receive beam direction will determine if the duration is zero (i.e. no communications will be received from that receive beam direction), or whether the duration is greater than zero. In some aspects, the larger the number of apparatuses known to be located in a receive beam direction, the longer the corresponding access period will be. Thus, in FIG. 9, the Access Period 0 would be longer than the Access Period 3, which would in turn be longer than the Access Period 2 because in the system 600 there are three apparatuses known to be located in the receive beam direction 0, two apparatuses known to be located in the receive beam direction 3, and one apparatus known to be located in the receive beam direction 2.

FIG. 11 illustrates an aspect 404c of the access period 404. Each of the Access Periods 0, 2, and 3 in the access period 404c are illustrated as having a duration that is proportional to the number of STAs in the corresponding receive beam direction. In addition, the access period 404c is illustrated in FIG. 11 as having an Access Period for each of receive beam directions 1, 4, and 5 interleaved between the Access Periods 0, 2, and 3. In the illustrated aspect, each of the Access Periods 1, 4, and 5 are shorter than any of the Access Periods 0, 2, and 3. In some aspects, the AP is configured to receive requests from known STAs in the Access Periods 0, 2, and 3, and is further configured to receive communications from apparatuses that have entered the system since the Access Periods were allocated. Those of skill in the art will appreciate that the order in which the Access Periods occur within the access period 404 may vary. For example, the Access Periods 1, 4, and 5 need not be interleaved with the Access Periods 0, 2, and 3. Instead, all of the Access Periods 1, 4, and 5 may be scheduled to occur after the Access Periods 0, 2, and 3.

In some aspects, the Access Period for receiving communications from a given receive beam direction is noncontiguous. For example, FIG. 12 illustrates an aspect 404d of the access period 404 in which the Access Periods 0 and 3 have each been split into a plurality of sub-periods, which are labeled Sub-Period 0 and Sub-Period 3, respectively. Those of skill in the art will understand that the duration of each of the sub-periods may be varied. In the aspect illustrated in FIG. 12, each Sub-Period is approximately equal in size. In one embodiment, the duration of each Sub-Period is allocated such that there is sufficient time during the Sub-Period to receive communications from a single STA. In this aspect, the Access Period for a given receive beam direction may be split into a number of sub-periods which is equivalent to the number of apparatuses known to be located in that receive beam direction. Thus, as can be seen in FIG. 12, the Access Period for receive beam direction 0 has been split into three Sub-Periods 0, and the Access Period for receive beam direction 3 has been split into two Sub-Periods 3. Access Periods for each of the receive beam directions 1, 4, and 5 are also illustrated, as described with respect to FIG. 11, but these Access Periods may be omitted. Although the Access Periods 1, 4, and 5, are shown as being roughly the same size as the Access Period 2 and the Sub-Periods 0 and 3, the duration of each of these periods may vary.

In some aspects, each direction from which the AP will receive communications is transmit in the beacon, as is an indication of a time or duration of time during which the AP will receive communications via that receive beam direction. In some aspects, a number of apparatuses known to be located in a receive beam direction is transmitted in the beacon, and each STA may calculate the time or duration of time from the number. Those of skill in the art will recognize other methods of communicating a varying duration of time. Access Periods having varying duration may be used in combination with a General Contention Access Period, described above.

FIG. 13 shows another aspect of the access period 404e, where a unique time for receiving communications from each known apparatus has been allocated. In this aspect, the AP is configured to receive communications from only a single apparatus during each division of the access period 404. Although the divisions are shown as being alphabetically ordered, no particular order is required. In some aspects, the divisions are ordered according to the location of each of the apparatuses, for example such that apparatuses that are located near each other are allocated divisions that are temporally close. These divisions may be referred to as scheduled access periods because an apparatus is scheduled for communication during each division.

The AP may be configured such that signals perceived by the antenna 216 are disregarded by the receiver 212, signal detector 218, and/or the processing system 204 if the signal was perceived during a division allocated to an apparatus that did not transmit the signal. For example, the AP may receive communications from any of the STAs 6A-6C via the receive beam direction 0 in the system 600. If the STA 6C transmits a signal during a division of the access period 404e allocated to the STA 6B, the AP may disregard the signal.

A time for receiving communications from each of the known apparatuses may be transmitted in the beacon, as may information identifying the known apparatuses or an order in which communications will be received from the known apparatuses. The information may comprise a device ID, for example, as described above. The AP may be configured to determine any divisions, Access Periods, and/or durations thereof, for example utilizing the processing system 204.

As described above, the AP may receive request messages from one or more apparatuses, for example during the access period 404. The request messages may be received during a CAP or a scheduled access period, which are described above. In some aspects, the AP may receive request messages at other times as well. Also, as described above, the request messages may comprise information indicating that a transmitting STA has data to transmit and requesting a time at which to transmit the data. If an AP receives a large number of request messages from a particular STA, this may be an indication that the STA has a large amount of data to transmit, or must transmit frequently to maintain a quality of service, or for other such reasons.

In some aspects, the AP may allocate additional portions of the access period 404 or other additional time during which the AP will receive communications from an STA that has transmitted a large quantity of request messages. For example, the AP may track or count the number of request messages received from each STA, and may allocate additional time to receive communications from an STA when the number of request messages received by the AP is above a threshold. The threshold may be predetermined, or may be determined by the AP based on any number of factors. In some aspects, an allocation or other indicator for the additional portions or time are transmitted in the beacon. In some aspects, the allocation of additional portions or time may be communicated during the CTAP 406, or during a portion of the access period 404 allocated to transmitting grant messages. In some aspects, the AP is configured to allocate a sticky assignment to an STA when the number of request messages received from the STA is greater than the threshold. Those of skill in the art will recognize methods of assigning and/or allocating sticky assignments.

Those of skill in the art will appreciate that two or more of the aspects of the access period 404 described above with respect to FIGS. 9-13 may be combined. For example, the access period 404 may comprise a plurality of Access Periods having a duration that is proportional to the number of apparatuses known to be located in a corresponding beam direction, where each apparatus in the beam direction is allocated a scheduled access period during the Access Period for the respective receive beam direction. The Access Period for one of the receive beam directions may be continuous, while the Access Period for another of the receive beam directions may be noncontiguous. Those of skill in the art will understand that the teachings herein do not limit any particular aspect herein described.

Forming a beam to receive communications from specific apparatuses, varying the duration of an Access Period, or allocating a unique time for receiving communications from each known apparatus may decrease the likelihood of conflicts and/or may improve a reliability of receiving communications from an apparatus. In some aspects, however, transmitting such information, for example in a beacon or a plurality of beacons, may increase the overhead required in the system or may increase the time required to communicate with apparatuses located within the system. Utilizing the methods, beacons, schemes and other strategies described herein may, however, provide an advantage in receiving communications, while keeping the costs of transmission sufficiently low. The following tables show several values associated with a differing number and probability of a channel time request (CTRq) with respect to an overhead required of an implementing system. As can be seen in the below tables, methods implemented according to the teachings herein yield acceptable levels of overhead cost. For example, as can be seen in the table below, when an apparatus is allocated a scheduled access period the overhead may be kept below approximately six percent of a superframe.

| Scheduled Access Period AP sequentially repoints, num STA = 8 | | | | | |
|---|---|---|---|---|---|
| Overhead | Superframe Length (ms) | | | | |
| (% of Superframe) | 5 | 10 | 20 | 40 | 60 |
| 1 STA at a time | 6.4 | 3.2 | 1.6 | 0.8 | 0.5 |

As can be seen in the tables below, when a duration of a division within an access period is varied the overhead can often be maintained below ten percent of a superframe, where the exact values may differ depending on the probability of receiving a CTRq.

Varied Duration
Max # of STAs in any Rx dir 5
Pr[CTRq delivered within first CAP] 0.9
Number of AP Rx directions is 2

| Overhead | Superframe Length (ms) | | | | |
|---|---|---|---|---|---|
| (% of Superframe) | 5 | 10 | 20 | 40 | 60 |
| Pr[CTRq 0.2 | 12.0 | 6.0 | 3.0 | 1.5 | 1.0 |
| generated by 0.4 | 23.0 | 11.5 | 5.8 | 2.9 | 1.9 |
| STA per 0.6 | 29.0 | 14.5 | 7.3 | 3.6 | 2.4 |
| superframe] 0.8 | 34.0 | 17.0 | 8.5 | 4.3 | 2.8 |
| 1 | 40.0 | 20.0 | 10.0 | 5.0 | 3.3 |

Varied Duration
Max # of STAs in any Rx dir 5
Pr[CTRq delivered within first CAP] 0.68
Number of AP Rx directions is 2

| Overhead | Superframe Length (ms) | | | | |
|---|---|---|---|---|---|
| (% of Superframe) | 5 | 10 | 20 | 40 | 60 |
| Pr[CTRq 0.2 | 6.4 | 3.2 | 1.6 | 0.8 | 0.5 |
| generated by 0.4 | 12.0 | 6.0 | 3.0 | 1.5 | 1.0 |
| STA per 0.6 | 18.0 | 9.0 | 4.5 | 2.3 | 1.5 |
| superframe] 0.8 | 22.0 | 11.0 | 5.5 | 2.8 | 1.8 |
| 1 | 26.0 | 13.0 | 6.5 | 3.3 | 2.2 |

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. The computer-readable medium may be resident in the processing system, external to the processing system, or distributed across multiple entities including the processing system. Computer-readable medium may be embodied in a computer program product. By way of example, a computer program product may include a computer-readable medium in packaging materials.

In the hardware implementation described above, the computer-readable media may be part of the device or separate from the device. However, as those skilled in the art will readily appreciate, the computer-readable media may be external to the device. By way of example, the computer-readable media may include a transmission line, a carrier wave modulated by data, and/or a computer product separate from the wireless node, all which may be accessed by the processing system 204. Alternatively, or in addition to, the computer readable media, or any portion thereof, may be integrated into the processing system 204, such as the case may be with cache and/or general register files.

The processing system, any part of the processing system, or the processing system or a portion thereof in combination with one or more elements may provide the means for performing the functions recited herein. By way of example, the processing system executing code, the transmitter, and/or the antenna, alone or in combination, may in some aspects provide means for transmitting, for example means for transmitting an allocation of time for one or more of a plurality of receive beam directions. The allocation of time may be based at least in part on information regarding one or more apparatuses known to be located in the one or more of the receive beam directions. Also by way of example, the processing system executing code, the receiver, and/or the antenna, alone or in combination, may in some aspects provide means for receiving, for example means for receiving a communication from at least one of the one or more apparatuses via a receive beam direction in which the at least one apparatus is known to be located. Alternatively, the code on the computer-readable medium may provide the means for performing the functions recited herein.

Figure 19:
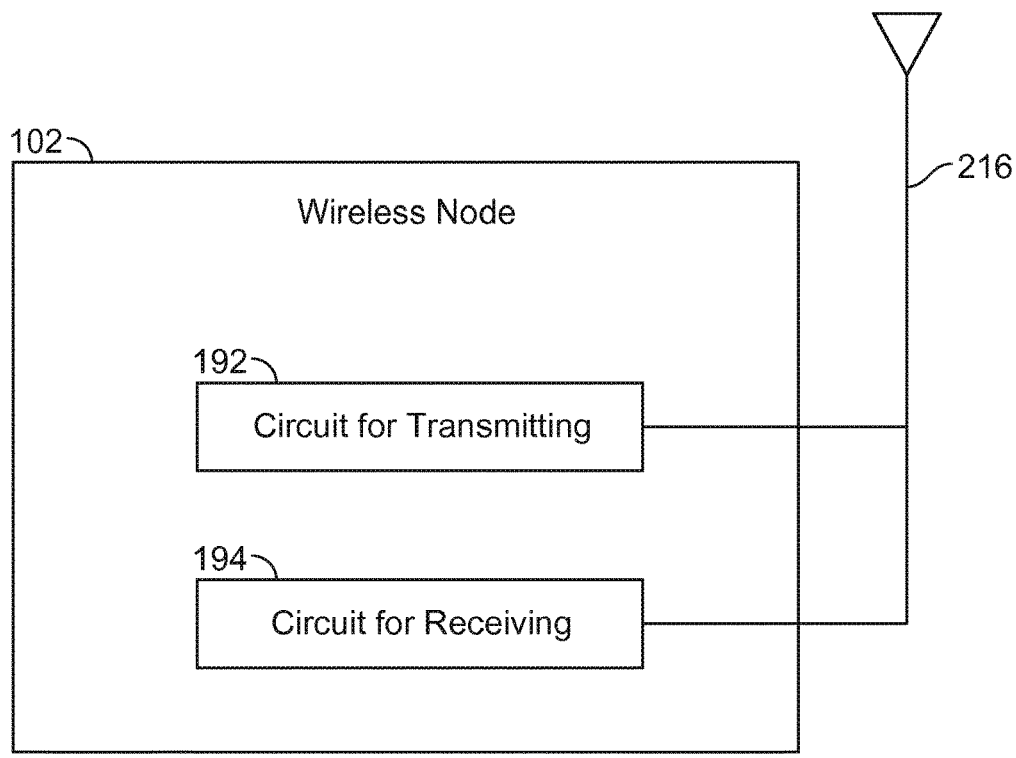
FIG. 19 illustrates an aspect of a node for use in the communication system illustrated in FIG. 1.

In some aspects, one or more of the functions recited herein are implemented in a circuit configured to perform the one or more functions. Similarly, the means described above may comprise one or more circuits configured to implement the functionality of the means. For example, FIG. 19 illustrates an aspect of the wireless node 102 comprising a circuit for transmitting 192 and a circuit for receiving 194. The circuit for transmitting 192 may be configured to transmit an allocation of time for one or more of a plurality of receive beam directions. The allocation of time may be based at least in part on information regarding one or more apparatuses known to be located in the one or more of the receive beam directions. Also in example, the circuit for receiving 194 may be configured to receive a communication from at least one of the one or more apparatuses via a receive beam direction in which the at least one apparatus is known to be located. The aspect of the wireless node 102 illustrated in FIG. 19 also comprises the antenna 216, described above with respect to FIG. 2, connected to the circuit for transmitting 192 and the circuit for receiving 194. In some aspects, the antenna 216 is omitted. In some aspects, one or more of the components illustrated in FIG. 2 may are incorporated into the aspect of the wireless node 102 illustrated in FIG. 19.

Those skilled in the art will recognize how best to implement the described functionality presented throughout this disclosure depending on the particular application and the overall design constraints imposed on the overall system.

It is understood that any specific order or hierarchy of steps or blocks described in the context of a method or software module is being presented to provide examples of a wireless node. Based upon design preferences, it is understood that the specific order or hierarchy of steps may be rearranged while remaining within the scope of the invention.

Figure 20:
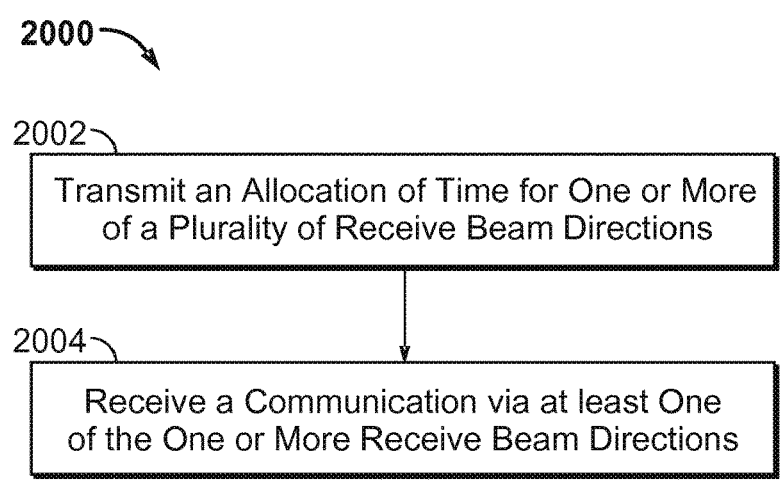
FIG. 20 illustrates an aspect of a method of communicating in a communication system.

Further, the number or configuration of blocks or actions of a method or software module may vary. For example, FIG. 20 illustrates an aspect of a method 2000 of communicating in a communication system, for example the system 600. The method 2000 may be performed in place of the method 700 illustrated in FIG. 7, and may be performed by any device that receives communications, for example by the AP illustrated in the system 600 or by the wireless node 102 illustrated in FIG. 19. At block 2002, an allocation of time is transmitted for one or more of a plurality of receive beam directions. For example, the circuit for transmitting may be used to transmit the allocation of time. In some aspects, the allocation of time for each of the one or more receive beam directions is based at least in part on information regarding one or more apparatuses known to be located in that receive beam direction. Next, at block 2004, a communication is received via at least one of the one or more receive beam directions. For example, a communication from at least one of the one or more apparatuses may be received using the circuit for receiving 194 via the receive beam direction in which the at least one apparatus is known to be located.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An apparatus for wireless communication, the apparatus comprising:
    a receiver configured to receive communications via a plurality of receive beam directions; and
    a transmitter configured to communicate an allocation of time for one or more of the receive beam directions, wherein:
        the allocation of time for each of the one or more receive beam directions is based at least in part on information regarding one or more apparatuses known to be located in each respective receive beam direction of the one or more of the receive beam directions; and
        the information regarding one or more apparatuses comprises a quantity of apparatuses known to be located in each of the one or more of the receive beam directions.

2. The apparatus of claim 1, wherein the allocation of time corresponds to a contention access period.

3. The apparatus of claim 2, wherein the receiver is configured to receive request messages from the one or more known apparatuses during at least a portion of the contention access period, the request messages requesting a time for transmitting data.

4. The apparatus of claim 3, further comprising a circuit configured to allocate a sticky assignment to one of the one or more known apparatuses based at least in part on a quantity of the request messages received from the one known apparatus.

5. The apparatus of claim 1, wherein an apparatus is known to be located in a first receive beam direction if signals transmitted from the apparatus are received via the first receive beam direction.

6. The apparatus of claim 1, wherein the allocation of time corresponds to one or more scheduled access periods.

7. The apparatus of claim 6, wherein the receiver is configured to receive request or control messages from a single apparatus during each of the one or more scheduled access periods.

8. The apparatus of claim 6, wherein an access period is scheduled for each known apparatus.

9. The apparatus of claim 1, further comprising a circuit configured to determine a length of the time allocated for at least one of the one or more of the receive beam directions.

10. The apparatus of claim 1, wherein the transmitter is configured to periodically transmit a beacon comprising an indication of the allocation of time.

11. The apparatus of claim 10, wherein the beacon further comprises information indicating each direction from which the receiver will receive the communications.

12. The apparatus of claim 10, wherein the transmitter is configured to successively transmit the beacon in a plurality of directions.

13. The apparatus of claim 10, wherein the beacon comprises information identifying the one or more apparatuses.

14. The apparatus of claim 1, further comprising a data structure storing information correlating the one or more of the receive beam directions and a quantity of apparatuses known to be located in the one or more of the receive beam directions.

15. The apparatus of claim 1, further comprising a circuit configured to perform beam tracking utilizing the transmitter and receiver.

16. The apparatus of claim 1, wherein a single apparatus is known to be located in each of the one or more of the receive beam directions.

17. The apparatus of claim 1, wherein the allocation of time for a first one of the receive beam directions differs from the allocation of time for a second one of the receive beam directions.

18. The apparatus of claim 1, wherein the allocation of time is contiguous.

19. The apparatus of claim 1, wherein the allocation of time is noncontiguous.

20. An apparatus for wireless communication, the apparatus comprising:

a receiver configured to receive communications via a plurality of receive beam directions; and a transmitter configured to communicate an allocation of time for one or more of the receive beam directions, wherein the allocation of time for each of the one or more receive beam directions is based at least in part on information regarding one or more apparatuses known to be located in each respective receive beam direction of the one or more of the receive beam directions, wherein the allocation of time is noncontiguous, wherein the allocation of time for a first one of the receive beam directions comprises a first quantity of noncontiguous sub-periods, wherein the allocation of time for a second one of the receive beam directions comprises a second quantity of noncontiguous sub-periods, and wherein the first quantity differs from the second quantity.

21. A method for wireless communication, the method comprising:

transmitting an allocation of time for one or more of a plurality of receive beam directions, wherein:

the allocation of time for each of the one or more receive beam directions is based at least in part on information regarding one or more apparatuses known to be located in each respective receive beam direction of the one or more of the receive beam directions; and the information regarding one or more apparatuses comprises a quantity of apparatuses known to be located in each of the one or more of the receive beam directions; and receiving a communication from at least one of the one or more apparatuses via the receive beam direction in which the at least one apparatus is known to be located.

22. The method of claim 21, wherein the allocation of time corresponds to a contention access period.

23. The method of claim 22, wherein the receiving comprises receiving request messages from the one or more known apparatuses during at least a portion of the contention access period, the request messages requesting a time for transmitting data.

24. The method of claim 23, further comprising allocating a sticky assignment to an apparatus based at least in part on a quantity of the request messages received from the apparatus.

25. The method of claim 21, wherein an apparatus is known to be located in a first receive beam direction when signals transmitted from the apparatus are received via the first receive beam direction.

26. The method of claim 21, wherein the allocation of time corresponds to one or more scheduled access periods.

27. The method of claim 26, comprising perceiving a signal transmit from a first apparatus during one of the scheduled access periods, and disregarding the signal, wherein the apparatus is not scheduled to transmit communications during the one of the scheduled access periods.

28. The method of claim 26, comprising scheduling an access period for each known apparatus.

29. The method of claim 21, further comprising determining a length of the time allocated for at least one of the one or more of the receive beam directions.

30. The method of claim 21, wherein the transmitting comprises periodically transmitting a beacon comprising an indication of the allocation of time.

31. The method of claim 30, wherein the beacon further comprises information indicating each direction from which communications will be received.

32. The method of claim 30, wherein the transmitting comprises successively transmitting the beacon in a plurality of directions.

33. The method of claim 30, wherein the beacon comprises information identifying the one or more apparatuses.

34. The method of claim 21, further comprising storing information in a data structure correlating the one or more of the receive beam directions and a quantity of apparatuses known to be located in the one or more of the receive beam directions.

35. The method of claim 21, further comprising performing beam tracking before the transmitting.

36. The method of claim 21, wherein a single apparatus is known to be located in each of the one or more of the receive beam directions.

37. The method of claim 21, wherein the allocation of time for a first one of the receive beam directions differs from the allocation of time for a second one of the receive beam directions.

38. The method of claim 21, wherein the allocation of time is contiguous.

39. The method of claim 21, wherein the allocation of time is noncontiguous.

40. A method for wireless communication, the method comprising:

transmitting an allocation of time for one or more of a plurality of receive beam directions, wherein the allocation of time for each of the one or more receive beam directions is based at least in part on information regarding one or more apparatuses known to be located in each respective receive beam direction of the one or more of the receive beam directions; and receiving a communication from at least one of the one or more apparatuses via the receive beam direction in which the at least one apparatus is known to be located, wherein the allocation of time is noncontiguous, wherein the allocation of time for a first one of the receive beam directions comprises a first quantity of noncontiguous sub-periods, wherein the allocation of time for a second one of the receive beam directions comprises a second quantity of noncontiguous sub-periods, and wherein the first quantity differs from the second quantity.

41. An apparatus for wireless communication, the apparatus comprising:

means for transmitting an allocation of time for one or more of a plurality of receive beam directions, wherein:

the allocation of time for each of the one or more receive beam directions is based at least in part on information regarding one or more apparatuses known to be located in each respective receive beam direction of the one or more of the receive beam directions; and the information regarding one or more apparatuses comprises a quantity of apparatuses known to be located in each of the one or more of the receive beam directions; and means for receiving a communication from at least one of the one or more apparatuses via the receive beam direction in which the at least one apparatus is known to be located.

42. The apparatus of claim 41, wherein the allocation of time corresponds to a contention access period.

43. The apparatus of claim 42, wherein the receiving means comprises means for receiving request messages from the one or more known apparatuses during at least a portion of the contention access period, the request messages requesting a time for transmitting data.

44. The apparatus of claim 43, further comprising means for allocating a sticky assignment to an apparatus based at least in part on a quantity of the request messages received from the apparatus.

45. The apparatus of claim 41, wherein an apparatus is known to be located in a first receive beam direction when signals transmitted from the apparatus are received via the first receive beam direction.

46. The apparatus of claim 41, wherein the allocation of time corresponds to one or more scheduled access periods.

47. The apparatus of claim 46, comprising means for perceiving a signal transmit from a first apparatus during one of the scheduled access periods, and means for disregarding the signal if the apparatus is not scheduled to transmit communications during the one of the scheduled access periods.

48. The apparatus of claim 46, comprising means for scheduling an access period for each known apparatus.

49. The apparatus of claim 41, further comprising means for determining a length of the time allocated for at least one of the one or more of the receive beam directions.

50. The apparatus of claim 41, wherein the transmitting means comprises means for periodically transmitting a beacon comprising an indication of the allocation of time.

51. The apparatus of claim 50, wherein the beacon further comprises information indicating each direction from which communications will be received.

52. The apparatus of claim 50, wherein the transmitting means comprises means for successively transmitting the beacon in a plurality of directions.

53. The apparatus of claim 50, wherein the beacon comprises information identifying the one or more apparatuses.

54. The apparatus of claim 41, further comprising means for storing information in a data structure correlating the one or more of the receive beam directions and a quantity of apparatuses known to be located in the one or more of the receive beam directions.

55. The apparatus of claim 41, further comprising means for performing beam tracking before the transmission.

56. The apparatus of claim 41, wherein a single apparatus is known to be located in each of the one or more of the receive beam directions.

57. The apparatus of claim 41, wherein the allocation of time for a first one of the receive beam directions differs from the allocation of time for a second one of the receive beam directions.

58. The apparatus of claim 41, wherein the allocation of time is contiguous.

59. The apparatus of claim 41, wherein the allocation of time is noncontiguous.

60. An apparatus for wireless communication, the apparatus comprising:

means for transmitting an allocation of time for one or more of a plurality of receive beam directions, wherein the allocation of time for each of the one or more receive beam directions is based at least in part on information regarding one or more apparatuses known to be located in each respective receive beam direction of the one or more of the receive beam directions; and means for receiving a communication from at least one of the one or more apparatuses via the receive beam direction in which the at least one apparatus is known to be located, wherein the allocation of time is noncontiguous, wherein the allocation of time for a first one of the receive beam directions comprises a first quantity of noncontiguous sub-periods, wherein the allocation of time for a second one of the receive beam directions comprises a second quantity of noncontiguous sub-periods, and wherein the first quantity differs from the second quantity.

61. A computer-readable storage device comprising instructions that when executed cause an apparatus to:

transmit an allocation of time for one or more of a plurality of receive beam directions; wherein:
  the allocation of time for each of the one or more receive beam directions is based at least in part on information regarding one or more apparatuses known to be located in each respective receive beam direction of the one or more of the receive beam directions; and
  the information regarding one or more apparatuses comprises a quantity of apparatuses known to be located in each of the one or more of the receive beam directions; and receive a communication from at least one of the one or more apparatuses via the receive beam direction in which the at least one apparatus is known to be located.

62. A wireless node comprising:

an antenna;

a receiver configured to receive, via the antenna, communications via a plurality of receive beam directions; and a transmitter configured to communicate an allocation of time for one or more of the receive beam directions, wherein:
  the allocation of time for each of the one or more receive beam directions is based at least in part on information regarding one or more apparatuses known to be located in each respective receive beam direction of the one or more of the receive beam directions; and
  the information regarding one or more apparatuses comprises a quantity of apparatuses known to be located in each of the one or more of the receive beam directions.

* * * * *